United States Patent
Vertanen

(10) Patent No.: US 7,971,919 B2
(45) Date of Patent: Jul. 5, 2011

(54) CARGO BED INSERT FOR UTILITY VEHICLE, FRONT END MOUNTING ASSEMBLY, AND OPTIONAL ACCESSORIES ITEMS FOR USE THEREWITH, ALONG WITH UTILITY VEHICLE INCORPORATING THE SAME

(75) Inventor: Michael J. Vertanen, Bartlett, IL (US)

(73) Assignee: Vertanen Industries, Inc., Bartlett, IL (US)

( * ) Notice: Subject to any disclaimer, the term of this patent is extended or adjusted under 35 U.S.C. 154(b) by 0 days.

(21) Appl. No.: 12/065,728

(22) PCT Filed: Jan. 12, 2007

(86) PCT No.: PCT/US2007/060520
§ 371 (c)(1),
(2), (4) Date: Apr. 21, 2009

(87) PCT Pub. No.: WO2007/084864
PCT Pub. Date: Jul. 26, 2007

(65) Prior Publication Data
US 2009/0200823 A1   Aug. 13, 2009

Related U.S. Application Data

(60) Provisional application No. 60/758,717, filed on Jan. 13, 2006.

(51) Int. Cl.
*B60R 13/01* (2006.01)
*B60R 9/052* (2006.01)

(52) U.S. Cl. .............. 296/39.2; 296/50; 296/32; 296/43; 296/3; 410/32; 410/89; 410/96; 410/110; 410/36

(58) Field of Classification Search .................. 296/39.1, 296/39.2, 50, 52, 24.4, 32, 36, 43, 3; 410/96, 410/89, 108, 110, 32, 35, 36, 42
See application file for complete search history.

(56) References Cited

U.S. PATENT DOCUMENTS

| | | | | |
|---|---|---|---|---|
| 176,893 A | * | 5/1876 | Sallee | 296/36 |
| 315,677 A | * | 4/1885 | Taft | 296/32 |
| 2,555,529 A | * | 6/1951 | Batts | 410/35 |
| 2,772,914 A | | 12/1956 | Hansen | |
| 3,490,787 A | | 1/1970 | Latterman et al. | |
| 4,310,193 A | | 1/1982 | Kolleas | |
| 4,322,107 A | | 3/1982 | Ishizuka et al. | |
| 4,505,508 A | * | 3/1985 | Carter et al. | 296/39.2 |
| 4,585,264 A | | 4/1986 | Miller | |
| 4,790,589 A | | 12/1988 | Moore et al. | |

(Continued)

*Primary Examiner* — Dennis H Pedder
(74) *Attorney, Agent, or Firm* — Holland & Hart LLP

(57) ABSTRACT

Various enhancements to the capabilities of vehicles in general, and particularly light-duty utility vehicles, which can advantageously enhance the cargo-carrying capabilities of such vehicles. The present invention provides a cargo bed insert, as well as an insert system, for removable attachment to a vehicle's existing cargo box. Improvement to a light-duty utility vehicle, where the improvement is in the form of a cargo box for the vehicle which includes one or more features of the described cargo bed insert and/or system is disclosed. The invention contemplates methods for enhancing the cargo-carrying capability of a light-duty utility vehicle. In particular, methods for enhancing the cargo-carrying capacity of such a vehicle beyond a manufacturer's specified cargo weight capacity are provided. Lastly, the invention includes a mounting assembly for a removable attachment to a vehicle's frame. The mounting assembly may be employed as a stand-alone item, or in conjunction with the cargo bed insert, to create a system for enhancing a vehicle's cargo-carrying capability.

32 Claims, 25 Drawing Sheets

U.S. PATENT DOCUMENTS

| | | |
|---|---|---|
| D336,062 S | 6/1993 | Austin |
| 5,240,301 A | 8/1993 | Arnold |
| 5,494,327 A * | 2/1996 | Derecktor ................. 296/3 |
| 5,509,710 A | 4/1996 | Eavenson et al. |
| 5,564,767 A | 10/1996 | Strepek |
| 5,573,300 A | 11/1996 | Simmons |
| 5,678,743 A | 10/1997 | Johnson et al. |
| 5,678,876 A | 10/1997 | Sargent et al. |
| 5,702,142 A | 12/1997 | Newell |
| 5,720,507 A | 2/1998 | Emery |
| 5,752,734 A * | 5/1998 | Ward et al. ................. 296/3 |
| 5,871,316 A * | 2/1999 | Bills ........................... 410/42 |
| 6,050,627 A | 4/2000 | Lee |
| 6,196,602 B1 * | 3/2001 | Esplin ......................... 296/3 |
| 6,210,087 B1 | 4/2001 | Bacon |
| 6,237,981 B1 | 5/2001 | Selleck |
| 6,478,356 B1 | 11/2002 | Wayne |
| 6,601,899 B2 | 8/2003 | Kiester et al. |
| 6,705,656 B2 | 3/2004 | Keller |
| 6,863,328 B2 * | 3/2005 | Kiester et al. ............. 296/37.6 |
| 6,905,159 B1 | 6/2005 | Saito et al. |
| 6,974,170 B2 | 12/2005 | Mulvihill |
| 6,994,388 B2 | 2/2006 | Saito et al. |
| 7,156,592 B1 * | 1/2007 | Cava ........................... 410/32 |
| 2001/0018994 A1 | 9/2001 | Carlsson |
| 2003/0085584 A1 | 5/2003 | Golden |
| 2005/0184548 A1 | 8/2005 | Saito et al. |

* cited by examiner

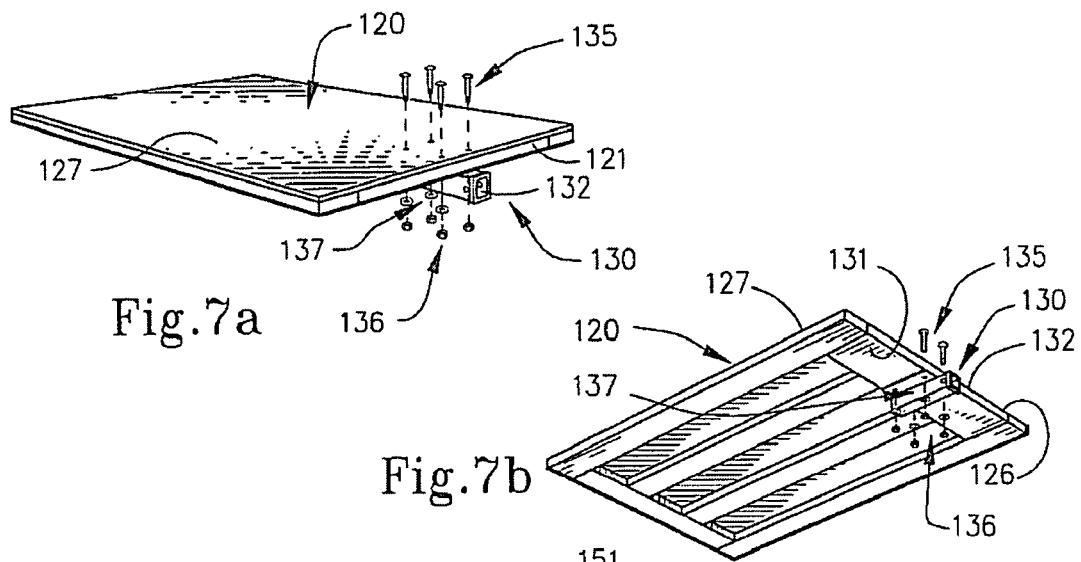
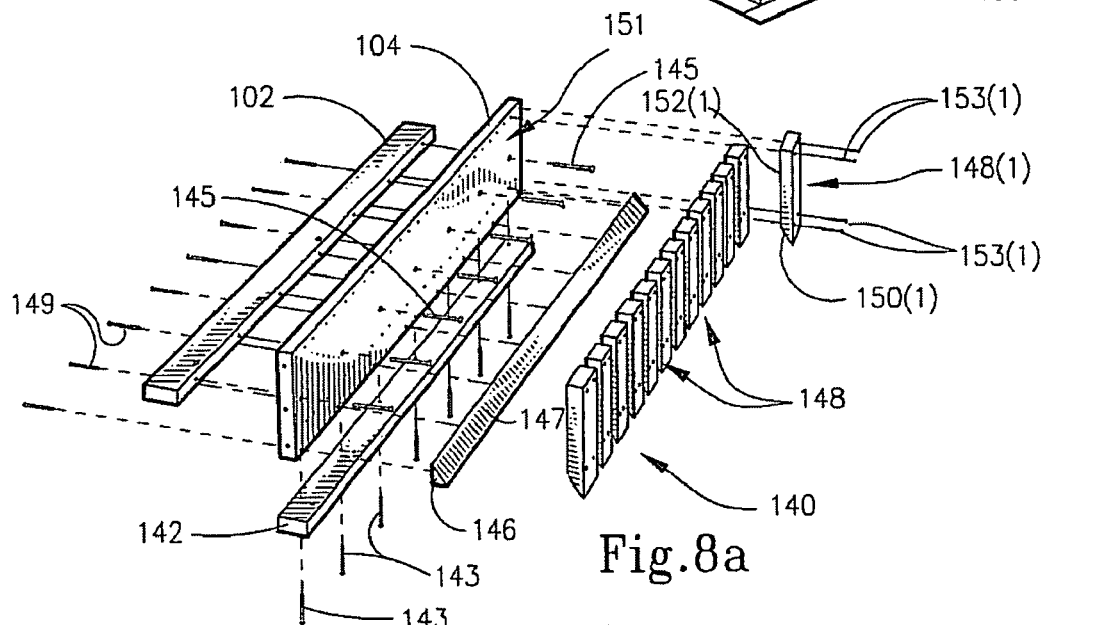
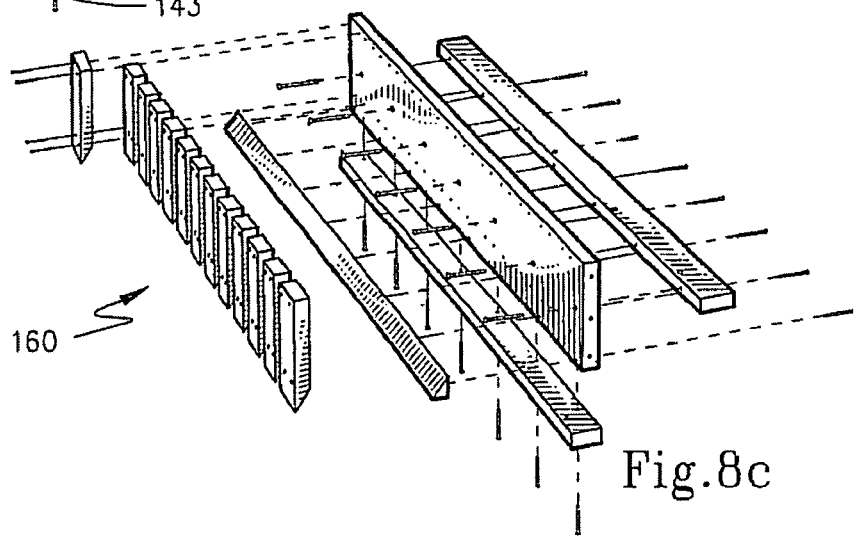

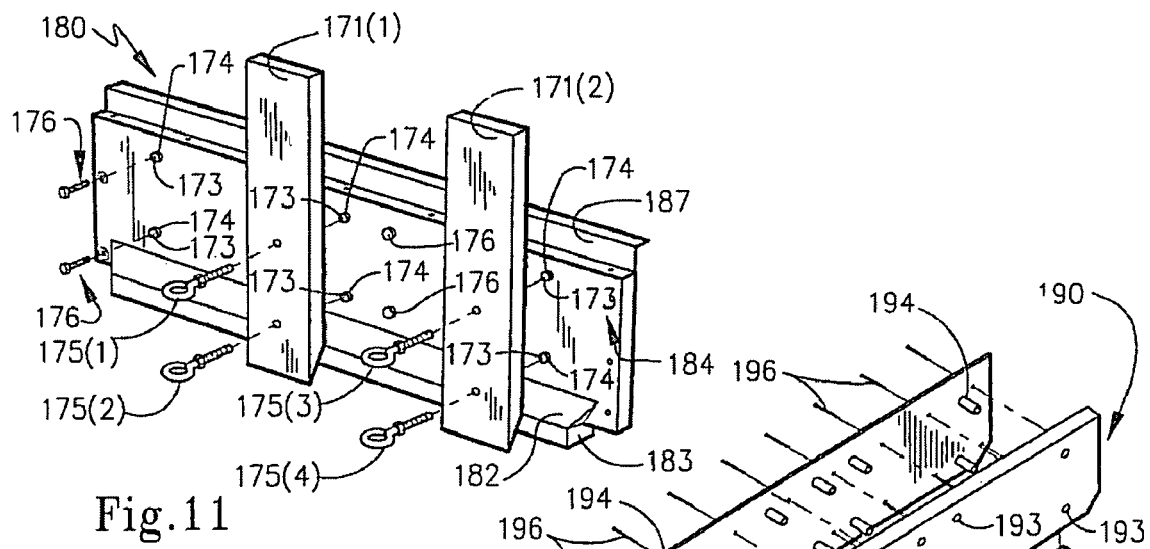
Fig.11
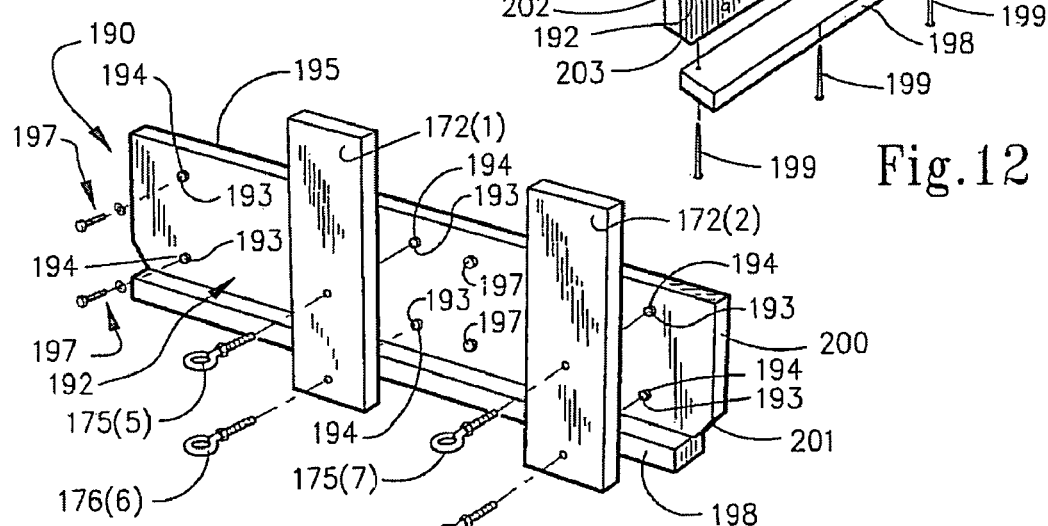
Fig.12
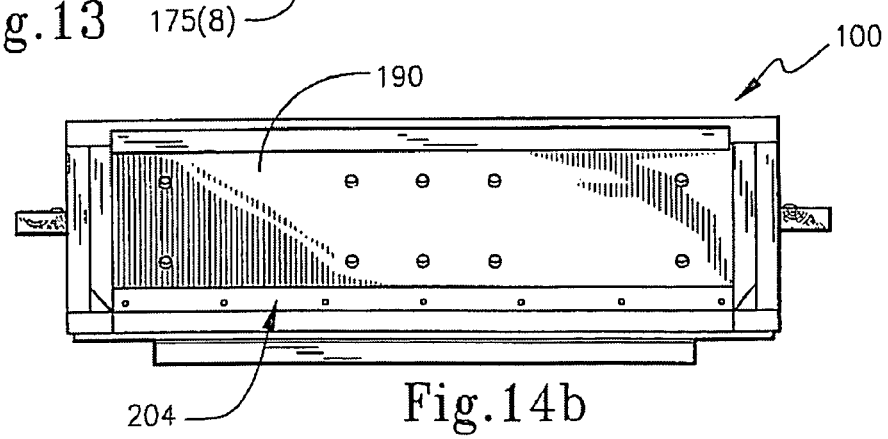
Fig.13
Fig.14b

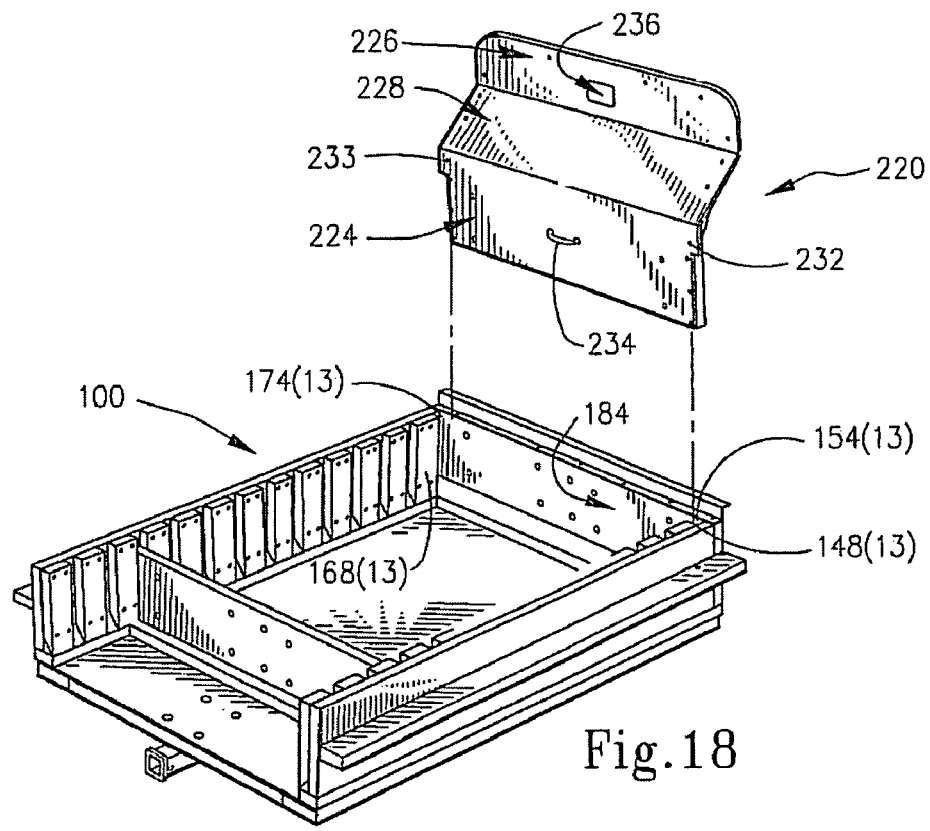
Fig.18
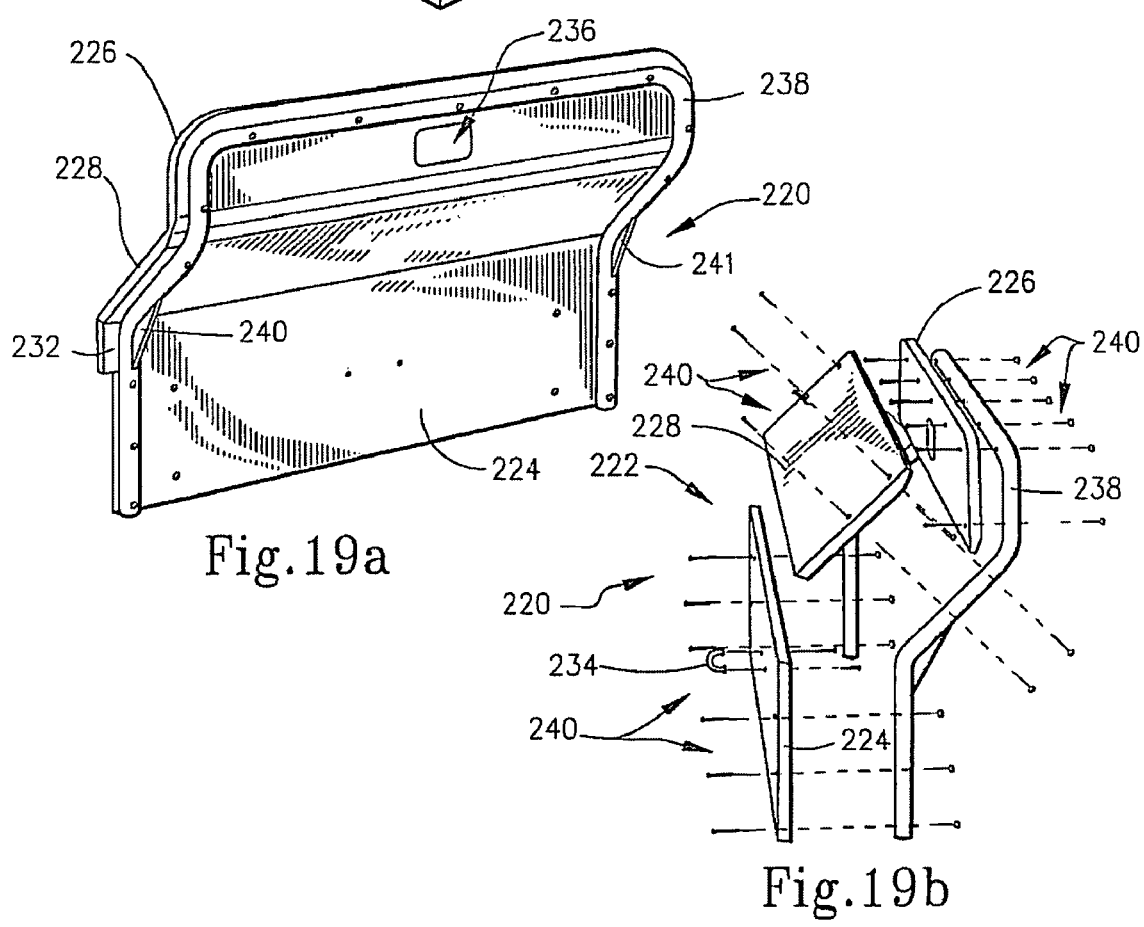
Fig.19a
Fig.19b

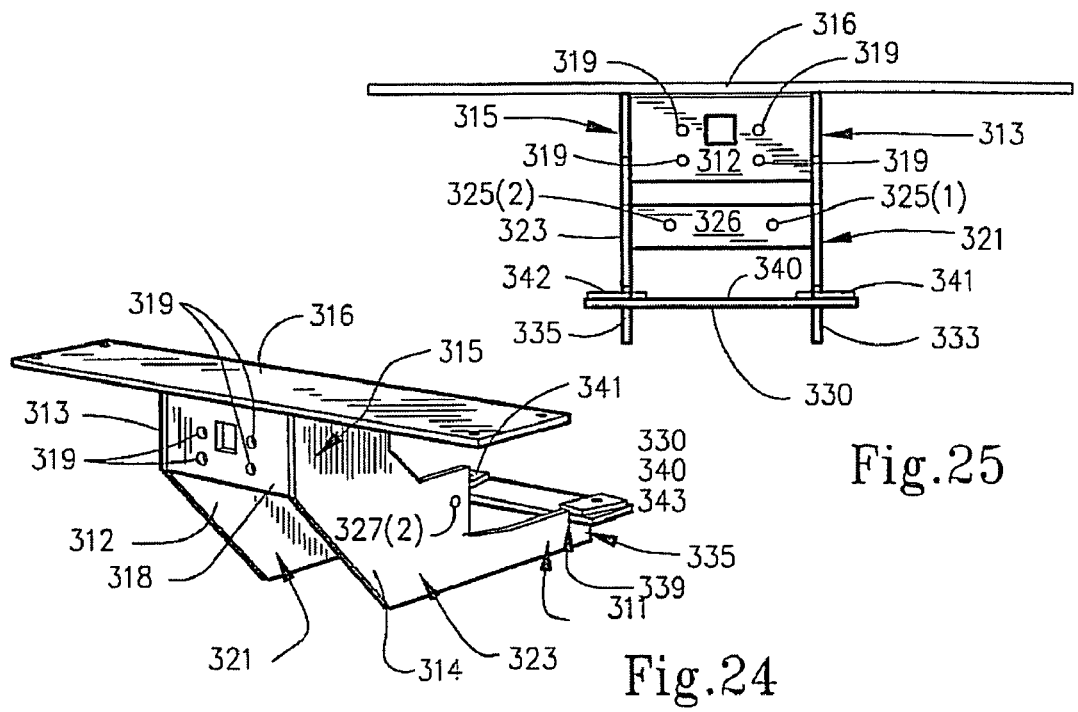
Fig.25
Fig.24
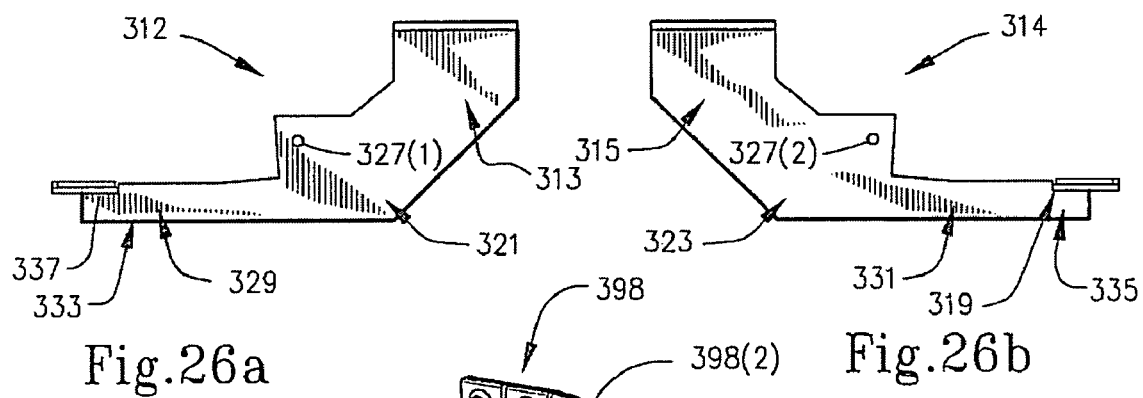
Fig.26a  Fig.26b
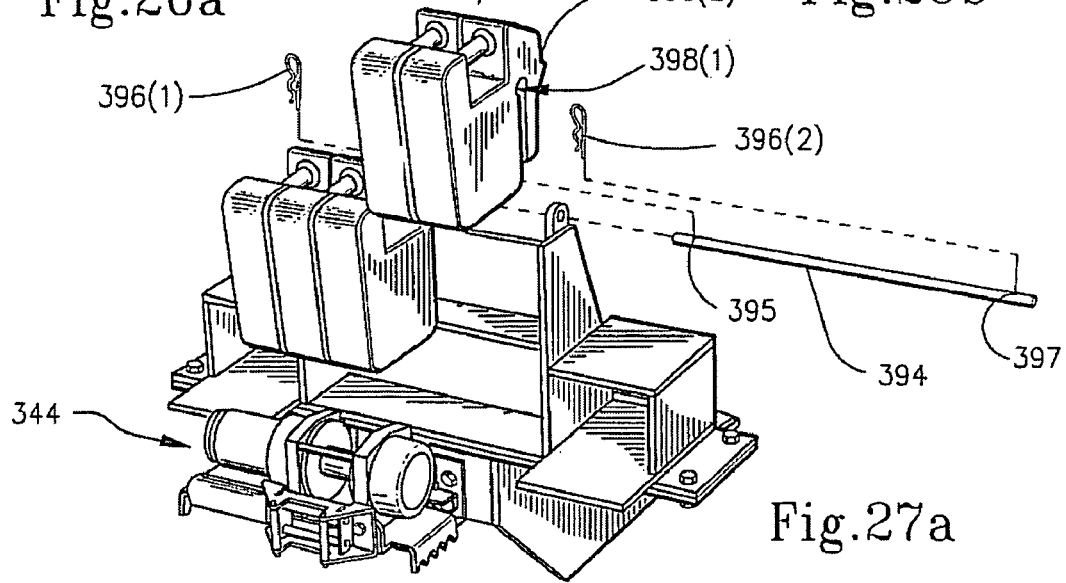
Fig.27a

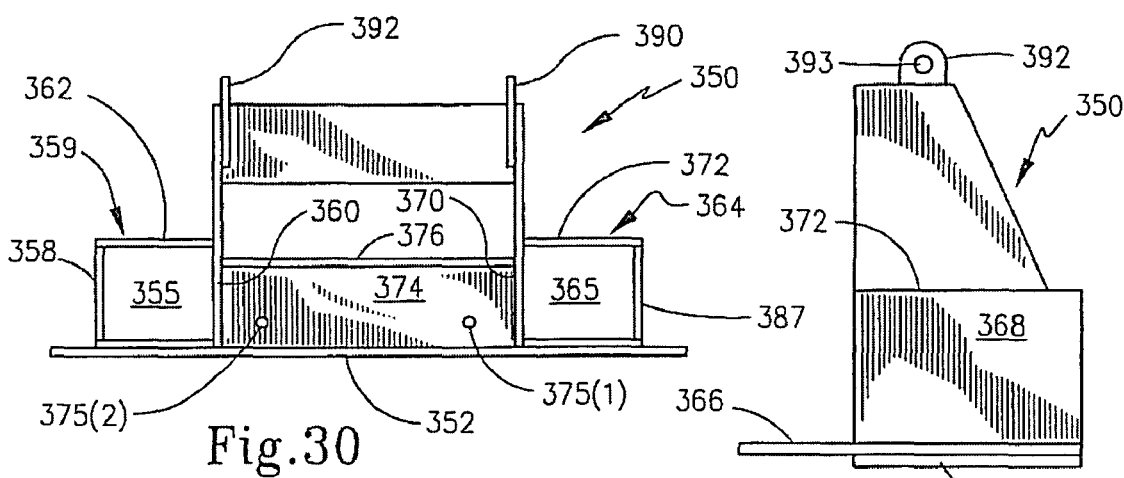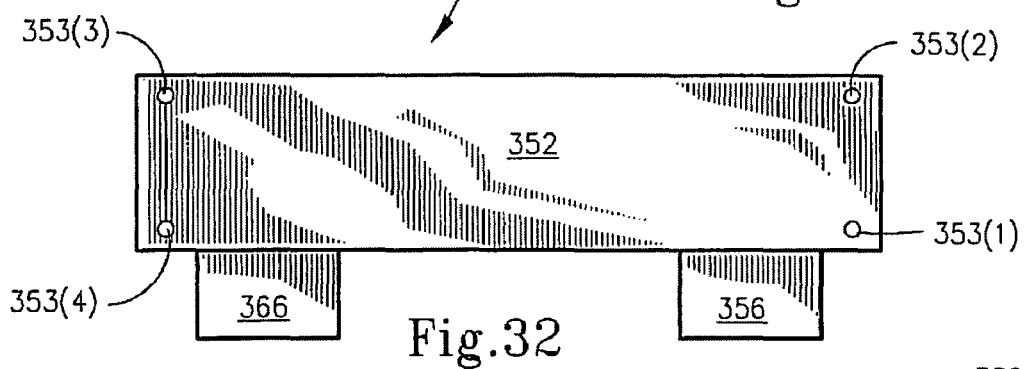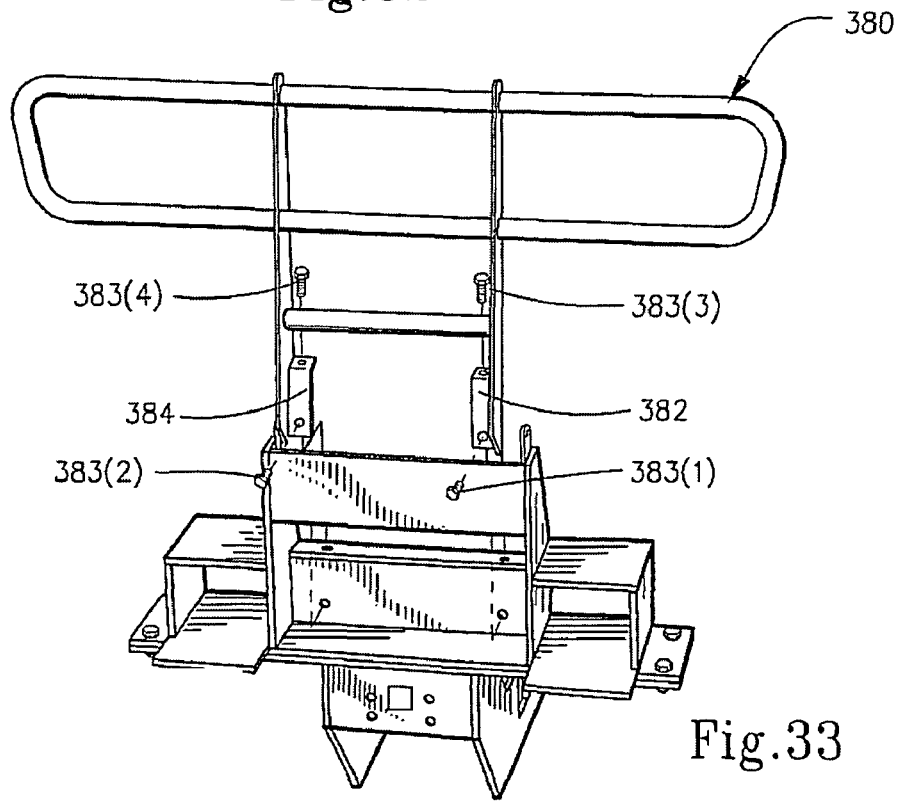

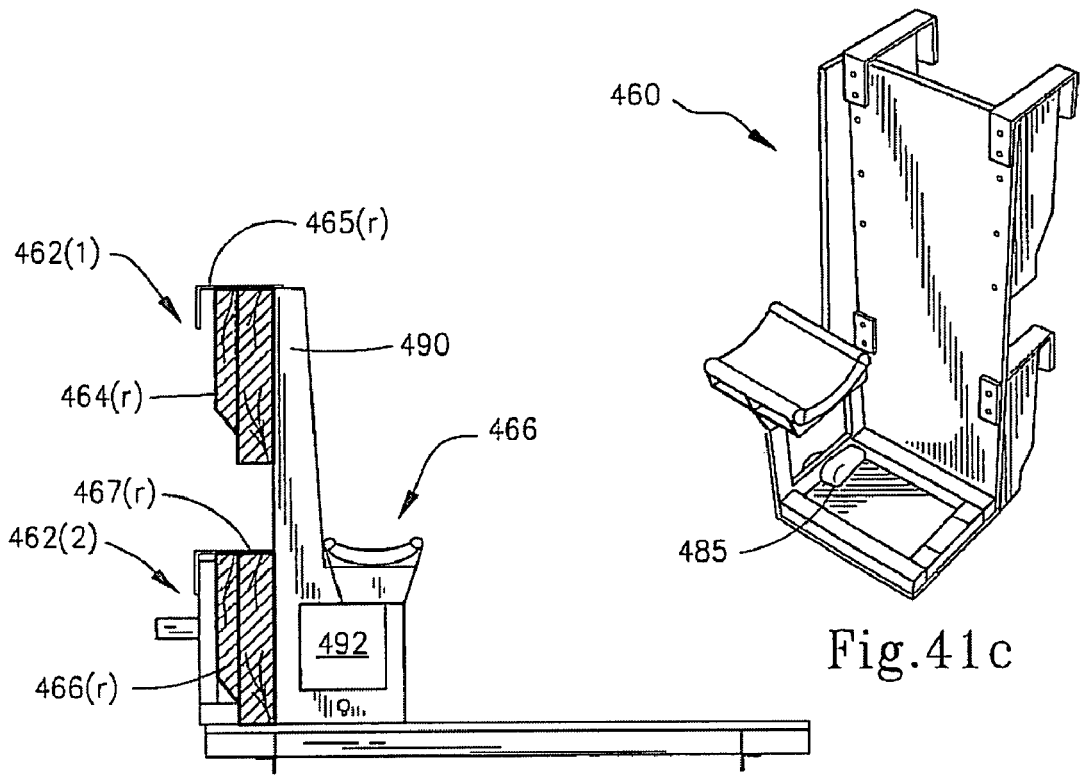
Fig.39
Fig.41c
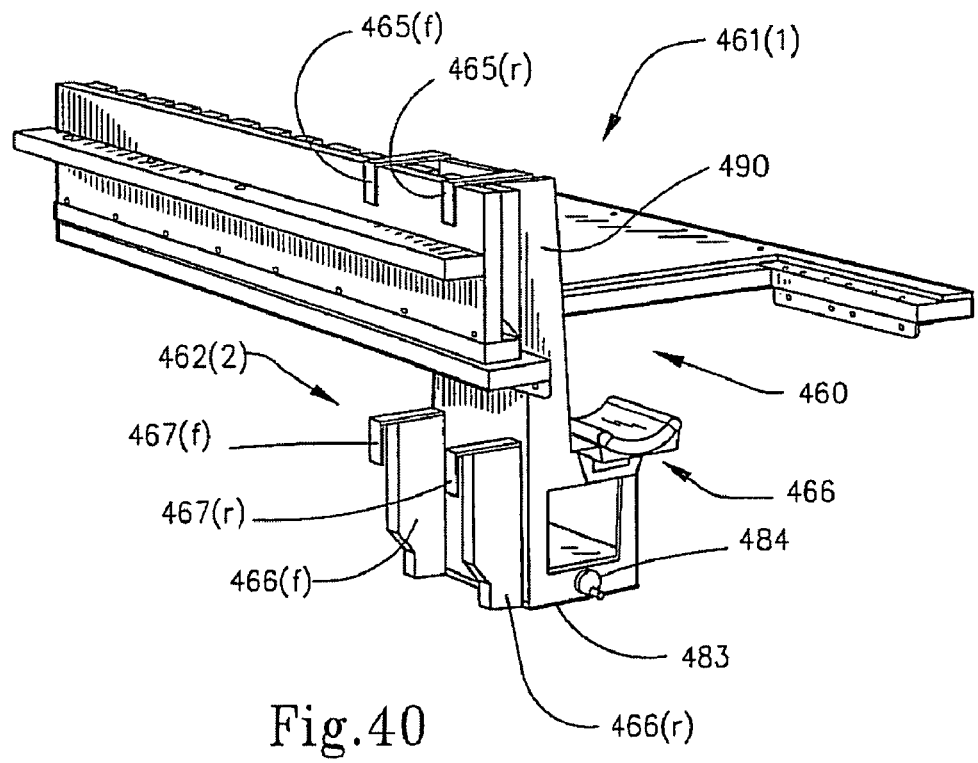
Fig.40

CARGO BED INSERT FOR UTILITY VEHICLE, FRONT END MOUNTING ASSEMBLY, AND OPTIONAL ACCESSORIES ITEMS FOR USE THEREWITH, ALONG WITH UTILITY VEHICLE INCORPORATING THE SAME

BACKGROUND

Construction projects occur in many different locations which are commonly chosen for their views, proximity to towns and infrastructure, value of the land, and natural features. Oftentimes, however, little regard is given to how difficult it will be to transport construction materials to the work site. In fact many construction projects are located in areas where the surrounding terrain, which makes transport difficult, is a principle reason for selecting the site. For instance, ski resorts are built on steep, rocky, mountainous terrain. Also, home locations with desirable views may be located atop hills or peaks, which naturally present challenges regarding access. In some cases roads may not be available either due to economic reasons or for concerns of environmental damage caused by cutting through sensitive ecological areas. Steep terrain, poor traction, and confining spaces such as between natural features (e.g. rocks, trees, landscaping) are all factors that contribute to the difficulty of transporting materials in these areas.

Even where a work site is accessible by road, transporting materials locally around the site itself can present a challenge. Where the construction project requires a basement or other significant excavation, steep grades can result. Like construction projects in areas with difficult natural terrain, construction projects among existing structures can result in tight quarters making the efficient movement of construction materials around the site difficult. For example, renovation to an existing home may be difficult to access due to neighboring homes or buildings. Transport of landscaping materials may also be inhibited by small spaces created between buildings, fences, retaining walls, and existing excavation.

Generally construction and landscape materials are transported to a worksite via large utility vehicles. Depending on the nature of the material being transported the size of the truck may vary. For instance, large trusses and beams may be hauled on a flatbed tractor-trailer. Many applications with smaller materials lend themselves to the use of a pick-up truck. Pick-up trucks are very popular for hauling material because they have a reasonably high load capacity and have a sufficiently large cargo bed to handle lengths of landscape timbers and plywood sheets, for example. Because pick-up trucks are smaller than large tractor-trailers they are also more maneuverable in certain areas. Pick-up trucks are also generally available with four-wheel drive capability allowing them to negotiate relatively steep terrain as well as areas of poor traction. The drawback of a pick-up truck, however, is that its size is still too large to transport materials in tight spaces as described above.

Also useful for transporting construction materials are light duty utility vehicles which are generally smaller and less expensive. Some light duty utility vehicles are available with four-wheel drive capability, such as the John Deer 6×4 Gator®. The Gator™ has an approximately 4 ft×4 ft factory-equipped cargo box for transporting various loads. With a payload capacity of approximately 1,400 lbs the Gator™ has sufficient carrying capacity to be useful on a construction site. The relatively small size of the vehicle compared to its larger counterparts allows access to tighter confines. The low center of gravity and four-wheel drive capability of the Gator™ make it ideal for accessing worksites on steep terrain with loose traction in tight areas. The Gator™ does, however, have a limitation in that the relatively small size of its factory-equipped cargo box can make it unsuitable for safely accommodating a variety of construction materials used at job sites. Furthermore, a drawback that both pick-up trucks and light duty utility vehicles share is that the cargo bed is of a fixed size. Many types of materials such as gravel, rock, brick and sand, have a tendency to shift or move around during transport if not suitably contained. Shifting and moving under transport can cause damage to not only the vehicle bed, but also to the material being transported. In some situations, shifting payload can also be dangerous by adversely affecting one's ability to control the vehicle.

Accordingly, while pick-up trucks and light duty utility vehicles are well-equipped for a variety of purposes, particularly on construction sites, there remains a need for a vehicle which is more versatile at handling the size and weight of common construction materials preferably without sacrificing hauling and towing capacity. It is also desirable that the vehicle be maneuverable on difficult terrain and in tight spaces while providing for a safe and stable operating environment. Provided herein is an approach for enhancing the capabilities of vehicles in general, and particularly light duty utility vehicles such as the Gator™.

It has also been found that a need exists to improve upon the manner in which injured individuals, such as professional football players and basketball players, as well as players of other sports, are transported off the field (or court) of play. With respect to the sport of football, for example, there currently are many ways to assist an injured player from the field. Aside from severe injury situations in which the injured player is transported via an ambulance manned by licensed medical personnel using commercially available stretchers and backboards, the manner by which players are transported in less serious injury situations typically fall into two categories.

A first category involves assistance from training staff personnel normally in the form of placing the injured player's arms around the shoulders of the healthy training staff individuals (one or two training staff persons) who support the majority of the injured player's weight. Some players, however, are so large that two staff persons are not sufficient and risk injury to their own backs as the staff person(s) attempts to balance an injured player as he tries to "hop" from the field of play. Additionally, the injured player's ankle, leg, thigh or hip is left in a "dangling" unsupported or unstable position which may further aggravate the injury or at the least leave the injured player very uncomfortable.

Another form of assistance involves the use of commercially available utility vehicles placed in service to give the player a ride from the point of injury to the point of treatment off the field of play. The commercially available vehicles currently in use involve golf carts equipped with a rear facing seat, the standard John Deere Gator™ with the tailgate removed, or several flat bed type vehicles. While these vehicles reduce the need for staff personnel to attempt to shoulder assist the injured player, they all present unique challenges to the injured player.

For example, the golf cart provides a seat with a platform footrest. The permanently fixed footrest acts as an impediment to load the player, especially in the case of an ankle or knee injury. This type of vehicle may also experience challenges of traversing fields that are extremely muddy or snow covered. This problem can be further exacerbated by the size of the player being transported, for example, and 325 lb football player in full gear. The standard John Deere Gator™, with tailgate removed, eliminates issues related to power and traction but does not supply a seat with a back support or any stabilizing accessories to provide player comfort for the injured limb during transport. Additionally, some players are so heavy that the vehicle can experience a significant loss of steering capability due to the lack of counterweights to assist with maintaining a suitable center of gravity that promotes maximum steering efficiency. The various flat bed vehicles provide sufficient power and payload handling capability but provide no back support or injured limb management for the comfort of the injured player or limb. Loading the player onto these vehicle types also presents challenges in vehicle bed height and player stabilization methods.

Provided herein is an approach for enhancing the capabilities of vehicles in general, and particularly light duty utility vehicles such as the Gator™. For at least the foregoing reasons, it is also desirable to provide and improved approach for more safely transporting injured individuals off the playing surface without jeopardizing vehicle control and maneuverability.

SUMMARY

In accordance with the above, various embodiments are described which can advantageously enhance the cargo-carrying capabilities of a vehicle, such as a light-duty utility vehicle. Among these are a cargo bed insert, as well as an insert system, for removable attachment to a vehicle's existing cargo box. Also described is an improvement to a light-duty utility vehicle, where the improvement is in the form of a cargo box for the vehicle which includes or more features of the described cargo bed insert/system. Methods are also provided for enhancing the cargo carrying capability of a light-duty utility vehicle, and for enhancing the cargo carrying capacity of such a vehicle beyond a manufacturer's specified cargo weight capacity. In addition, a mounting assembly is described for removable attachment to a vehicle's frame and the mounting assembly may be employed as a stand-alone item, or in conjunction with the cargo bed insert to create a system for enhancing a vehicle's cargo carrying capability.

BRIEF DESCRIPTION OF THE DRAWINGS

FIG. 1b is a rear passenger's side perspective view of the utility vehicle in FIG. 1a;

FIGS. 7a and 7b are different perspective views of the decking for illustrating the optional mounting of a hitch assembly thereto;

FIG. 8a is an exploded perspective view of the cargo bed insert's passenger's side wall, as viewed from a front driver's side position;

FIG. 8c is an exploded perspective view of the cargo bed insert's driver's side wall, as viewed from a front passenger's side position;

FIG. 11 is an exploded perspective view showing optional vertical load beams fastened to the front bed wall;

FIG. 12 is an exploded perspective view of the tailgate for the cargo bed insert;

FIG. 13 is an exploded perspective view showing optional vertical load beams fastened to tailgate of FIG. 12;

FIG. 14b is a rear view in elevation showing the tailgate after it has been inserted in the inverted position;

FIG. 18 is a rear perspective view of the cargo bed insert, and illustrates the removable insertion of the optional debris shield;

FIG. 19a is a front perspective view of the debris shield;

FIG. 19b is an exploded perspective view of the debris shield;

FIG. 24 is a perspective view of the front end mounting assembly's lower portion;

FIG. 25 is a rear view in elevation of the lower portion;

FIG. 26a is a left side view in elevation of the lower portion;

FIG. 26b is a right side view in elevation of the lower portion;

FIG. 27a is a front perspective view of the front end mounting assembly provided with a winch accessory, and illustrating optional weights being suspending there from;

FIG. 30 is a rear view in elevation of the upper portion of the front end mounting assembly;

FIG. 31 is a right side view in elevation of the upper portion of the front end mounting assembly;

FIG. 32 is a bottom plan view of the upper portion of the front end mounting assembly;

FIG. 33 is an exploded perspective view of the front end mounting assembly and showing its ability to receive an optional brush guard assembly;

FIG. 39 is a partial rear view in elevation of the modified cargo bed insert, and showing the right leg support situated therein in a stowed position;

FIG. 40 is a driver's side rear perspective view of a portion of the modified cargo bed insert, and showing the right leg support situated therein in a use position;

FIGS. 41a-41c are different elevated perspective views of the right leg support, of which FIG. 40c has the footrest plate removed.

DETAILED DESCRIPTION

Provided is a cargo bed for a vehicle and a front end mounting assembly which may be used either separate from, or in conjunction with the cargo bed. As will be described, various accessories can be used with the cargo bed, including a debris shield, load beams for transporting oversized materials, and an individual transport sub-assembly which can be used, for example, to transport injured individuals.

The cargo bed may be in the form of an insert to be used with a vehicle's factory equipped cargo bed. In this regard, it can be interchangeably referred to as either a cargo bed insert or a cargo box insert. Alternatively, some or all of its features may be incorporated as part of the factory-equipped cargo bed/box. The exemplary embodiments are described with reference to a cargo bed insert for use with a utility vehicle that is designed to be maneuverable in locations which are inaccessible to traditional larger sized utility vehicles, such as pick-up trucks. However, this should not be construed as limiting the invention, and the artisan will recognize that the teachings herein can be incorporated into, or provided as accessory items for, a variety of vehicle designs. The following detailed description is, therefore, not to be taken in a limiting sense.

Figure 1A:
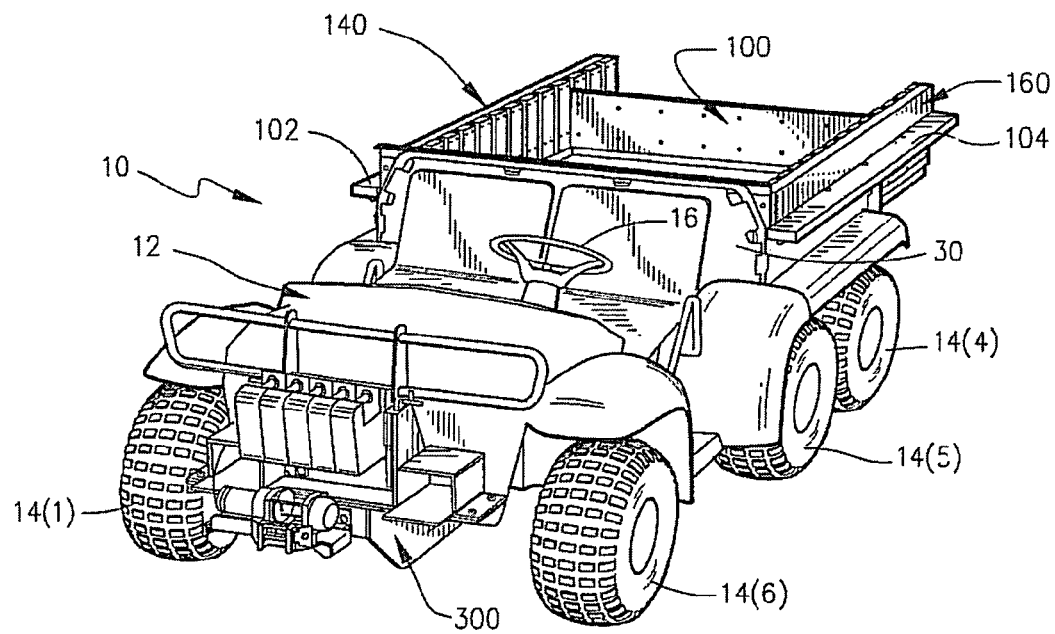
FIG. 1a is a front driver's side perspective view of a utility vehicle provided with a cargo bed insert and a front end mounting assembly in accordance with the exemplary embodiments.
Figure 1B:
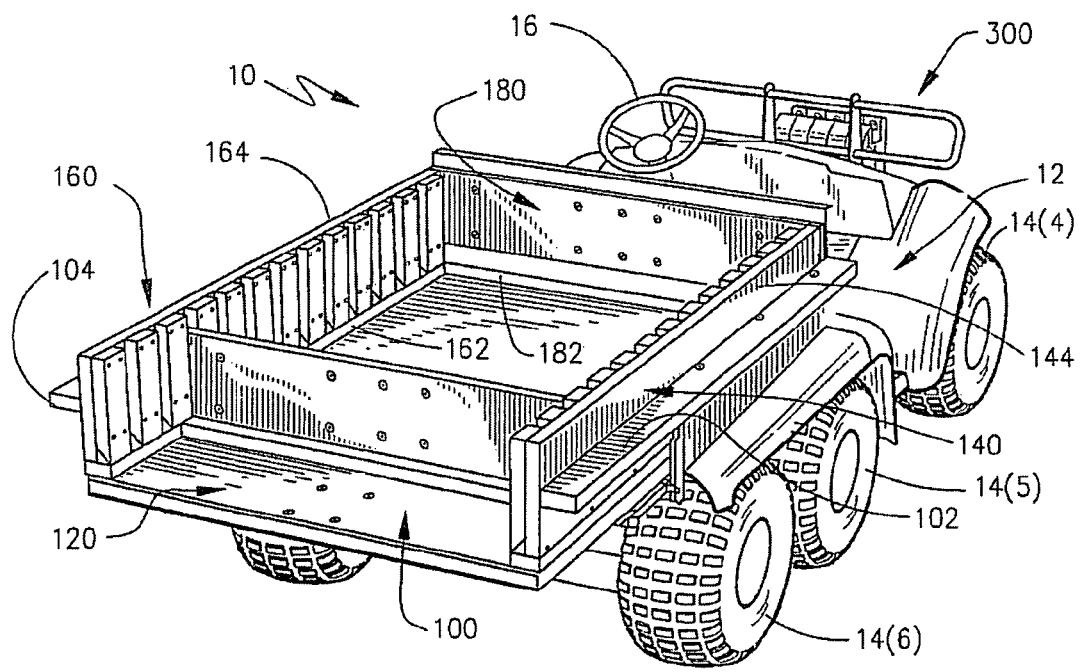

Initial reference is made to FIGS. 1a & 1b which show a commercial utility vehicle 10 that incorporates a cargo bed insert 100 (or cargo box insert) for transporting various types of cargo loads, and a front end mounting assembly 300 used in conjunction with insert 100. Cargo bed insert 100 accommodates a variety of different types of cargo loads, for example, construction materials for use at a job site. To this end, the construction materials might include lumber, landscape timbers, plywood, metal piping, pvc tubing, drainage rock, and sand, to name a representative few. In the exemplary embodiments, utility vehicle 10 is a Gator™ TH 6×4 available from Deere & Company (John Deere), headquartered in Moline, Ill. This vehicle has the advantage of being maneuverable in areas which are otherwise inaccessible to larger utility vehicles, while having a low center of gravity for operation along difficult terrains. This model can also be equipped with a variety of accessory items such as a winch, a brush guard and an electric lift which also make it a desirable choice. As can be appreciated in FIGS. 1a & 1b, vehicle 10 includes a body (generally 12) which supports a drive assembly that includes a plurality of wheels 14(1)-14(6) and a steering mechanism 16.

Figure 2A:
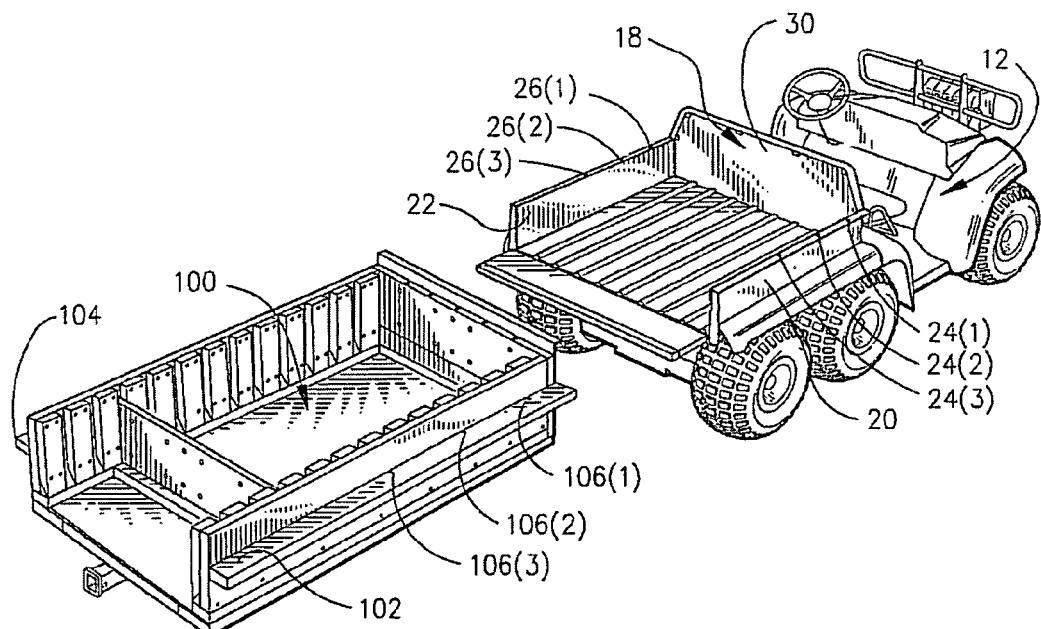
FIGS. 2a-2c are exploded and elevated rear perspective views of the utility vehicle and illustrate the removable attachment of the cargo bed insert.
Figure 2B:
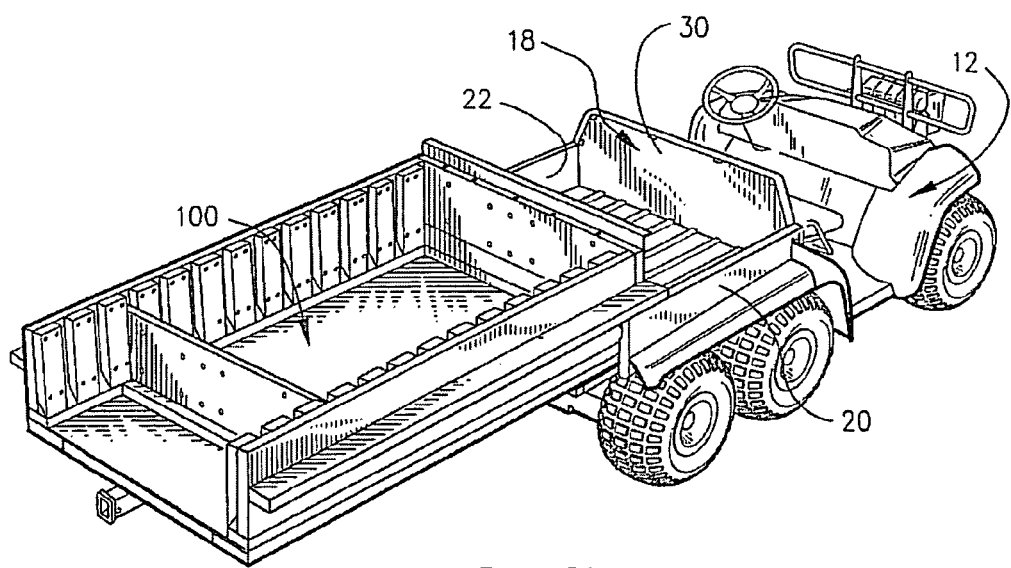
Figure 2C:
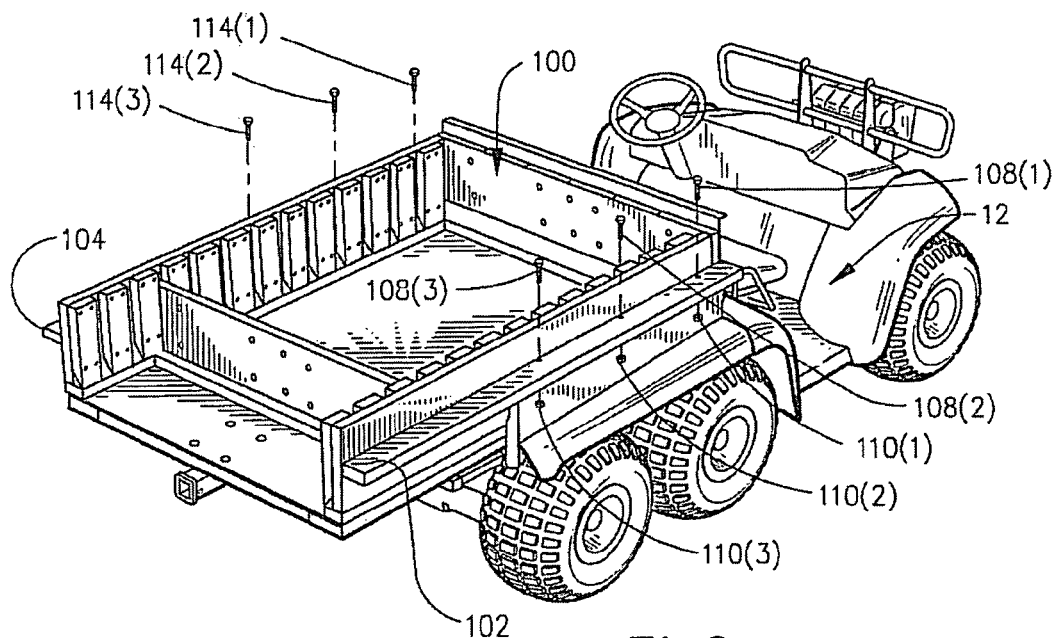

Vehicle body 12 also incorporates the factory-equipped cargo bed 18 as shown in FIG. 2a. Preferably, cargo bed insert 100 is removable and attachable relative to the factory-equipped cargo bed 18, as perhaps best illustrated in FIGS. 2a-2c. More particularly (and as viewed from the front of the vehicle), it can be seen that the vehicle's existing cargo bed 18 has left and right side beds 20 and 22, respectively. Left side bed 20 is situated on the passenger's side of the vehicle and is provided with a plurality of spaced apart left side bed mounting holes 24(1)-24(3). Likewise, right side bed 22, which is situated on the driver's side of the vehicle, is provided with a plurality of spaced apart right side bed mounting holes 26(1)-26(3). Cargo bed insert 100 includes left and right ledge rails 102 and 104, respectively. Left ledge rail 102 includes a plurality of associated left rail holes 106(1)-106(3) which are respectively alignable with left side bed mounting holes 24(1)-24(3). Bolts 108(1)-108(3), preferably stainless steel, are inserted through the aligned holes to engage cooperative nuts 110(1)-110(3), thereby securely mounting left ledge rail 102 to left side bed 20. Similarly, and with reference to FIGS. 2a-2c and 3a, right ledge rail 104 includes a plurality of associated right rail holes 112(1)-112(3) which are respectively alignable with right side bed mounting holes 26(1)-26(3). Stainless steel bolts 114(1)-114(3) are inserted through the aligned holes to engage cooperative nuts 116(1)-116(3), thereby securely mounting right ledge rail 104 to right side bed 22.

Figure 3A:
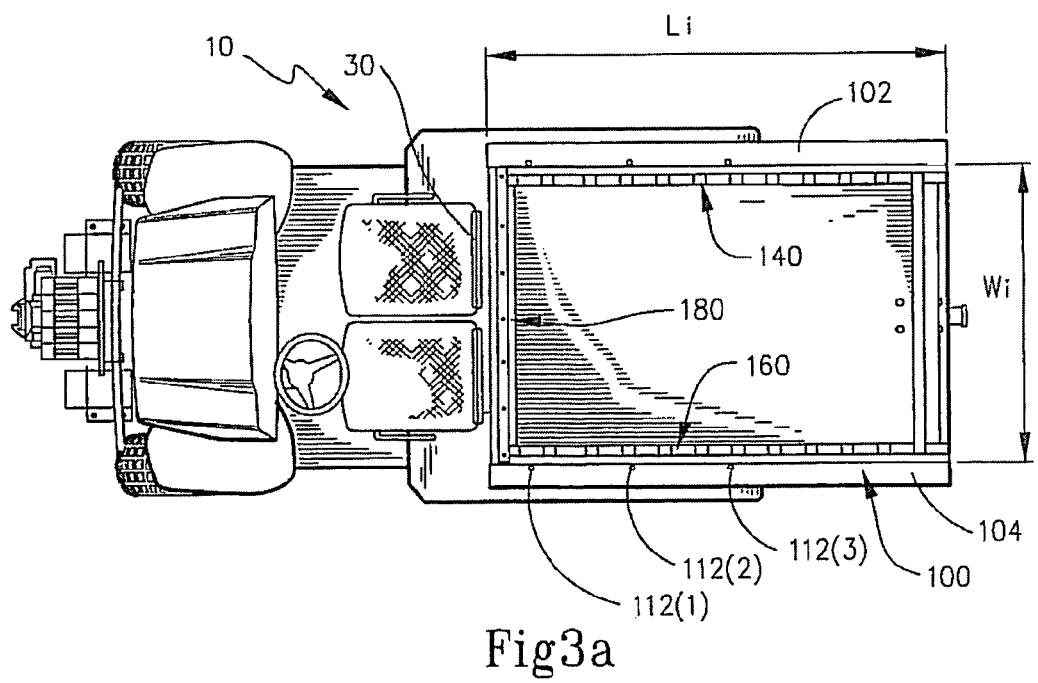
FIG. 3a is a top plan view of utility vehicle shown in FIGS. 1a & 1b.
Figure 3B:
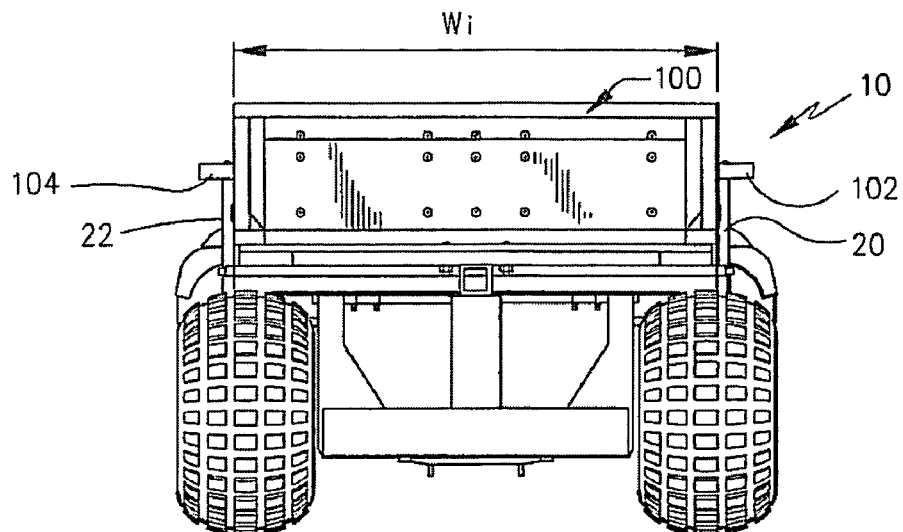
FIG. 3b is a rear view in elevation of utility vehicle shown in FIGS. 1a & 1b.
Figure 3C:
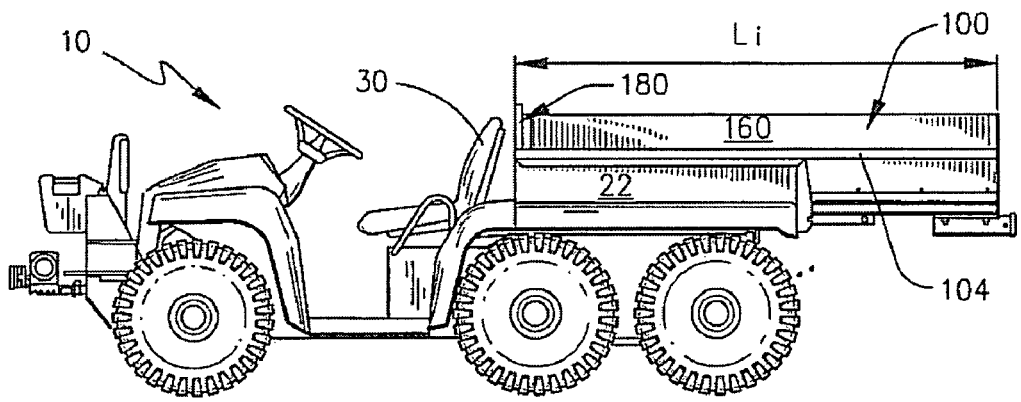
FIG. 3c is a driver's side view in elevation of utility vehicle shown in FIGS. 1a & 1b.

It may be appreciated that cargo bed insert 100 is dimensioned to be nestably received substantially within the confines of the vehicle's existing cargo bed 18 when in the mounted state shown in FIGS. 1a & 1b. Cargo bed insert includes a decking 120 and a plurality of walls—namely, left and right side bed walls 140 and 160, respectively, and a front bed wall 180. It can be appreciated from various ones of the figures that, without accounting for ledge rails 102 and 104, cargo bed insert 100 has an outer transverse width ("$W_i$" in FIGS. 3a & 3b) extending between its left and right insert walls 140,160 which closely approximates but is less than the maximum interior width between the cargo bed's factory-equipped left and right side beds 20,22. Once inserted, left and right insert walls 140,160 respectively confront left and right side bed walls 20, 22, while the insert front wall 180 confronts the vehicle's front bed 30 behind the seatback. Cargo bed insert 100, however, has an elongated dimension ("$L_i$" in FIGS. 3a & 3c) which is greater than that of the vehicle's cargo bed 18 such that insert 100 overhangs the utility vehicle's tailgate 32, preferably by about 18 inches when inserted as shown in FIG. 3c. This extension, under certain loads, requires offset weighting in the front of the utility vehicle 10 in order to maintain a low center of gravity, as well as steering and vehicle control—hence, the optional provision of front end mounting assembly 300.

Cargo bed insert 100 in the exemplary embodiment is constructed from pressure treated lumber of standard dimensions, but the ordinarily skilled artisan should readily appreciate that it could be constructed from any of a variety of materials, for example, plastic, aluminum, recycled rubber compounds, or steel of suitable gauge and composition, to name a few. In the exemplary embodiment, the cargo beds' decking, side walls, front wall, and tailgate are constructed as sub-assemblies, but this is not necessary. That is, the walls, decking and tailgate could be separate parts which are assembled individually and then assembled together to form the entire unit, or it could be an integral unitary construction. Moreover, while the cargo bed insert 100 in the exemplary embodiment is adapted for removable attachment to the utility vehicle, it is certainly contemplated that the insert's features and capabilities could be incorporated as part of the vehicle's factory-equipped cargo bed/box. Thus, an improved cargo bed construction is also contemplated. Cargo bed insert 100 will now be more particularly described in FIGS. 1-20c, while front end mounting assembly 300 will is more particularly described with reference to FIGS. 21-34.

Figure 4A:
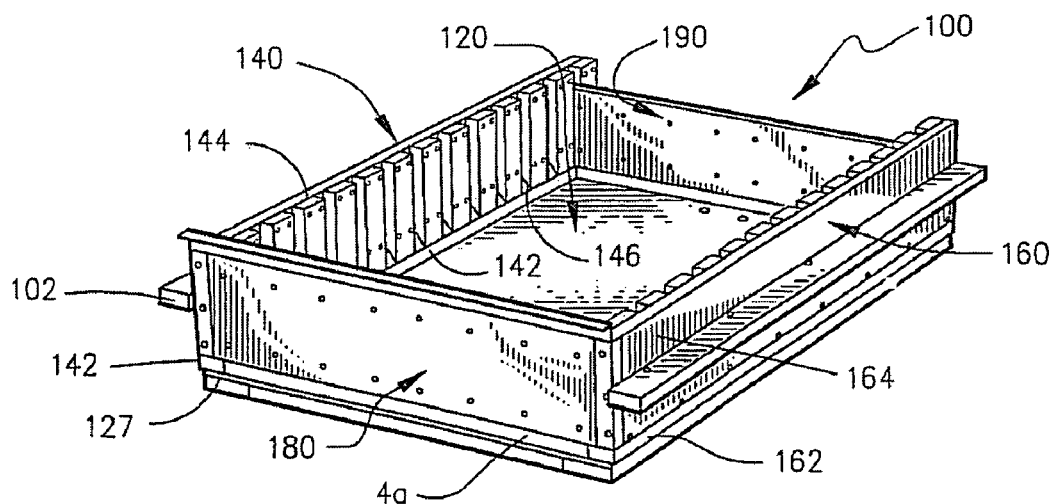
FIG. 4a is a front perspective view of the cargo bed insert.
Figure 4B:
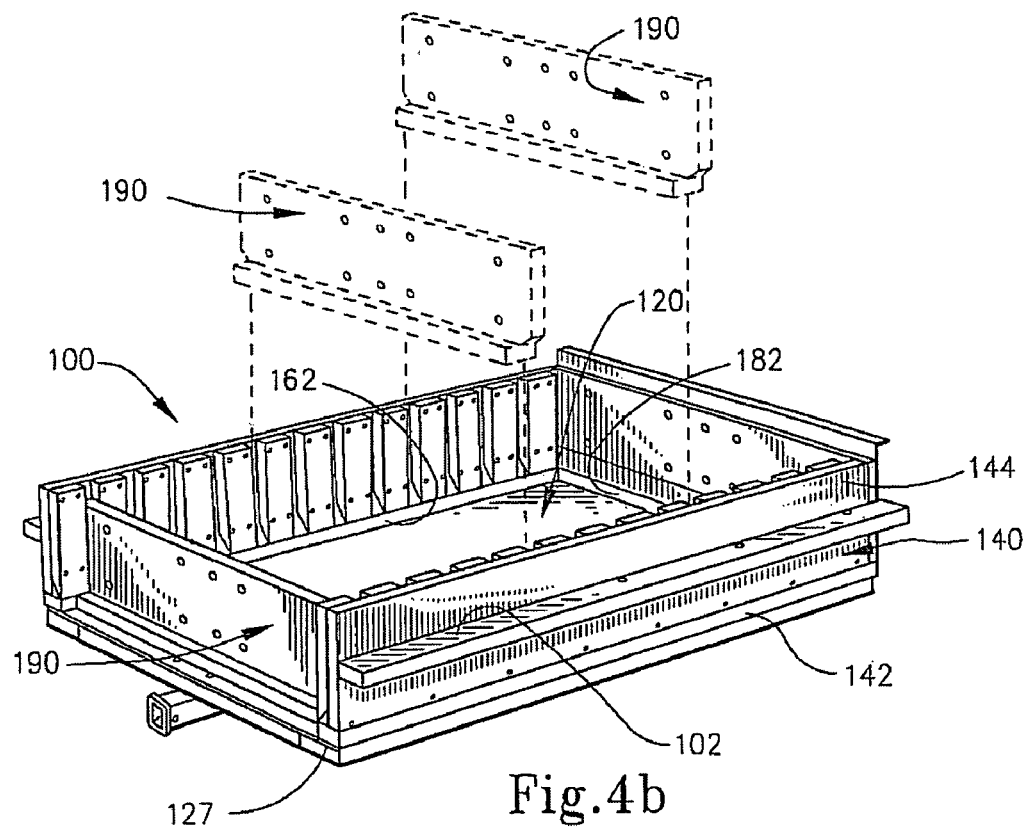
FIG. 4b is a rear perspective view of the cargo bed insert and showing, in phantom, representative positions for the tailgate insert.
Figure 5A:
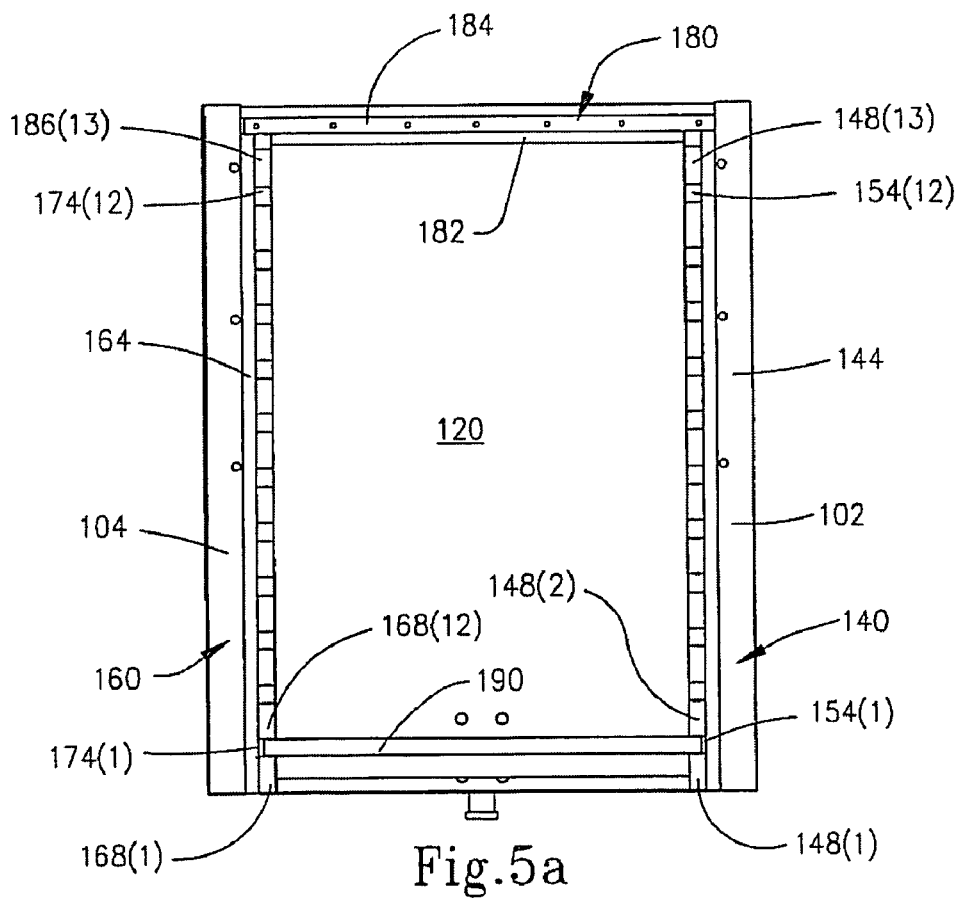
FIG. 5a is a top plan view of the cargo bed insert.
Figure 5B:
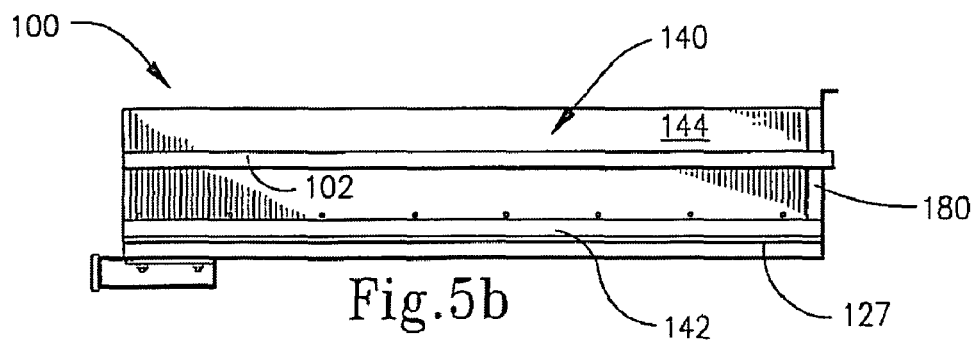
FIG. 5b is a passenger's side view in elevation of the exterior of the cargo bed insert.
Figure 5C:
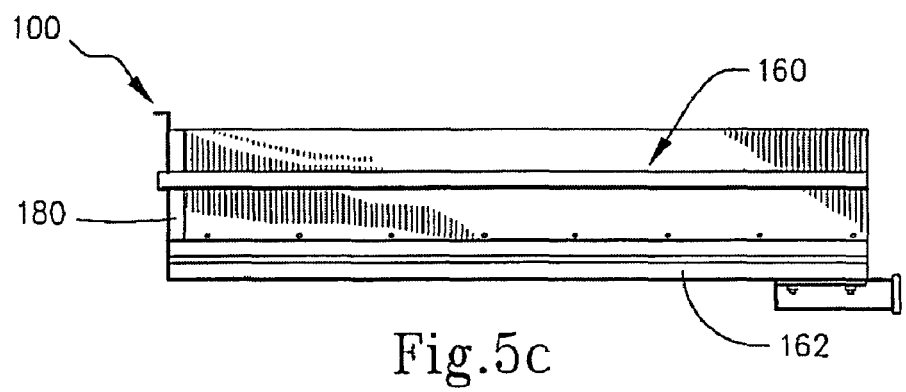
FIG. 5c is a driver's side view in elevation of the exterior of the cargo bed insert.

Cargo bed insert 100 is box-like in configuration. As perhaps best shown in FIGS. 4a-6b, the insert's decking 120 is a rectangular construction and the left and right insert side walls 140 and 160 are upstanding constructions which extend longitudinally along edge margin's of the decking 120. The insert's front bed wall 180 is an upstanding construction which extends transversely along a front edge margin of decking 120. As illustrated in FIG. 4b, a removable tailgate 190 can be selectively positioned within the cargo bed insert at discrete locations such that it spans between left and right bed walls 140 and 160 to generally separate the insert's interior 113 into a plurality of regions. In this regard, removable tailgate can be considered as a partitioning member, or simply a partition. Tailgate 190 is described in greater detail below with reference to FIGS. 12 & 13.

Figures 6A, 6B:
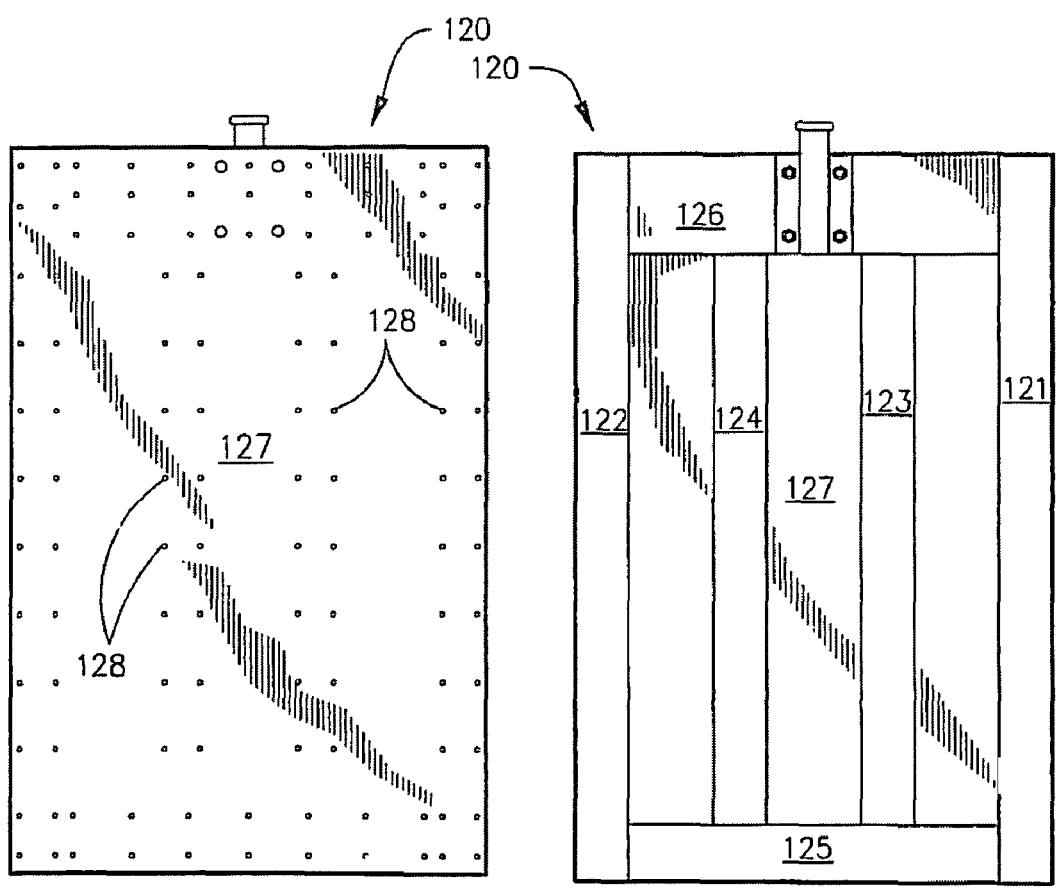
FIG. 6a is a top plan view of the cargo bed insert's decking.
FIG. 6b is a bottom plan view of the cargo bed insert's decking.
Figure 8B:
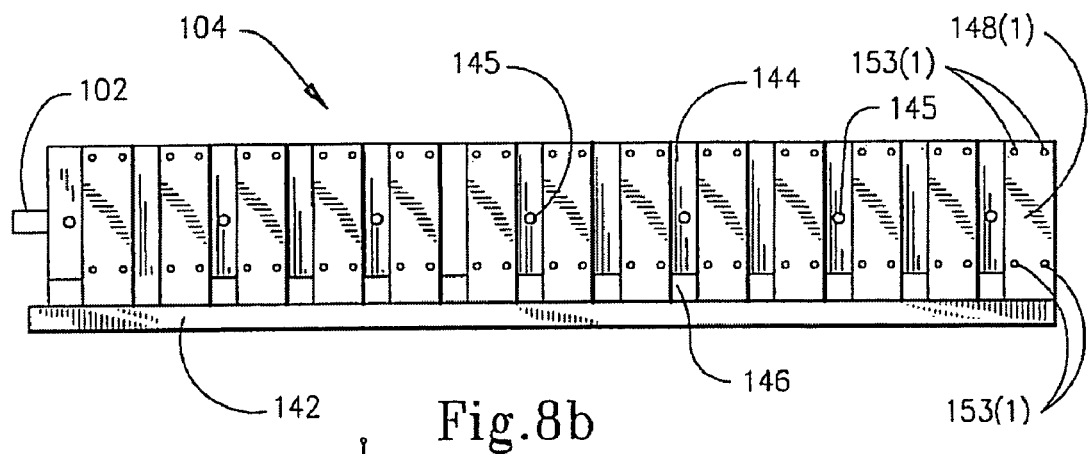
FIG. 8b is a view from the driver's side in elevation of the interior passenger's side wall.

Decking 120 is shown in FIGS. 6a & 6b to be a sub-assembly which includes a pair of longitudinally extending left and right deck beams 121 and 122, respectively, a pair of longitudinally extending medial deck beams 123 & 124, and a pair of transversely extending front and rear deck beams 125 and 126, respectively. As shown in FIG. 6b, medial beams 123,124 extend between front and rear deck beams 125,126 which themselves extend between left and right deck beams 121,122. Each of beams 121-125 is formed from pressure treated 2×6 lumber, while rear beam 126 is 2×10 lumber. A ¾" thick plywood panel 127 spans the upper surfaces the various beams and is secured thereto at suitable locations by screws, generally 128, as shown in FIG. 6a. The screws here and elsewhere in the cargo bed insert's construction are preferably coated deck screws, although stainless steel screws could also be employed.

With reference to FIGS. 7a & 7b, a hitch receiver assembly 130 may be is removeably mounted to transverse rear beam 126 and panel 127. Hitch receiver assembly 130 includes a standard hitch receiver 132 that is welded to a hitch mounting plate 134. Mounting plate 134 in mounted in a confronting relationship to the lower surface 131 of beam 126 by a plurality of carriage bolts (generally 135) which extend through plywood panel 127, beam 126 and the mounting plate 134. Cooperatively sized nuts (generally 136) and lock washers (generally 137) engage the carriage bolts 134 to securely fasten hitch receiver assembly 130 to decking 120.

The cargo bed insert's left and right side walls 140 (FIGS. 8a & b) and 160 (FIG. 8c) mirror one another in construction. As such, only one side wall, for example left side wall 140, need be described in detail to appreciate the construction of the other. Representative left side wall 140 is also a sub-assembly, the construction of which is perhaps best appreciated with reference to FIGS. 4a-b, 5b & 8a-8b. Left side wall 140 projects upwardly from the decking's plywood panel 127. Left side wall 140 includes an elongated 2×3 beam 142 which is formed from standard 2×4 lumber. Beam 142 extends along the entire length of the plywood panel's left edge margin and is fastened thereto by suitably positioned ones of the deck screws 128 in FIG. 6a. A 2×10 outer wall panel 144 is fastened to an upper edge margin of elongated beam 142 via deck screws (generally 143). Left ledge rail 102 is secured to upstanding wall 144 by a plurality of fasteners (generally 145). Fasteners 145 are preferably earthquake bolts known in the industry as "Simpson strong ties". These bolt fasteners are counter sunk at approximately every 6-8 inches along the length of left ledge rail 102. Right ledge rail 104 is secured in like fashion. The ledge rails together with the Simpson Strong Ties provide an assembly that acts as a single unit with regard to "lateral shear strength" of the stainless bolts that attach the cargo box to the factory installed cargo box.

A ramped beam 146 also extends along the upper surface of elongated beam 142. Ramped beam 146 has a vertical face which abuts a lower interior surface of wall 144 and a ramped surface 147 oriented at an angle of approximately 45° relative to the upper surface of beam 142. Ramped beam 146 is secured to upstanding wall 144 by screw fasteners (generally 149). Evenly distributed along the full length of (or at least along a portion of) the left side wall 140 are a plurality of tailgate spacer posts (generally 148), each of which has a lower 45° miter cut. As such, each spacer post, such as rear-most spacer post 148(1) has an associated ramp surface 150(1) which faces ramped surface 147, and a vertical surface 152(1) which is mounted in facing relationship to the interior surface 151 of upstanding wall 144 by deck screws 153(1). A plurality of tailgate insert slots 154(1)-154(12) are, thus, defined between longitudinally adjacent ones of posts 148(1)-148(13), as perhaps best appreciated with reference to FIG. 5a. Each slot 154(1)-(12) faces a respective laterally opposed slot 174(1)-174(12) associated with right side bed 160 so that tailgate 190 can be selectively inserted there between at desired locations along the length of cargo bed insert 100 in order to generally divide the interior into a plurality of regions. It can be appreciated that, when the tailgate 190 is inserted such that it spans between left and right side walls 140 and 160, a forward region is surrounded on all four sides, while the rear region is not by virtue of the cargo bed insert's open end. The ordinarily skilled artisan should appreciate that the number and distribution of the left and right spacer posts may be selectively varied as desired to accommodate ones particular needs.

Figure 9:
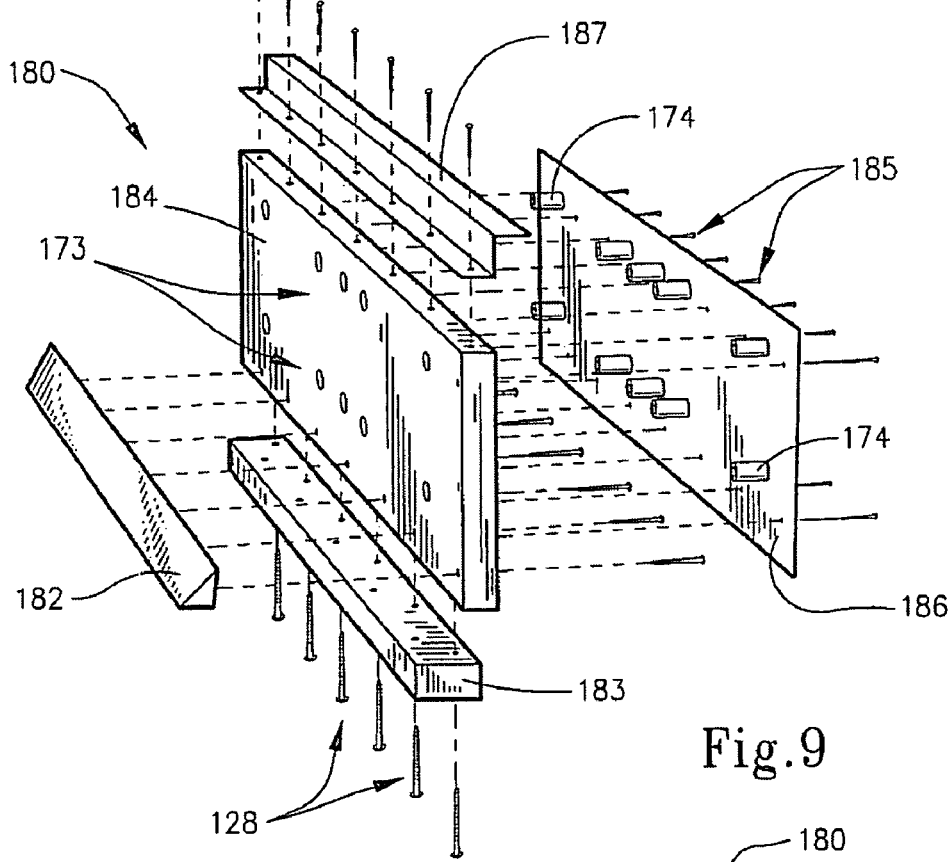
FIG. 9 is an exploded perspective view of the cargo bed insert's front wall.
Figure 10:
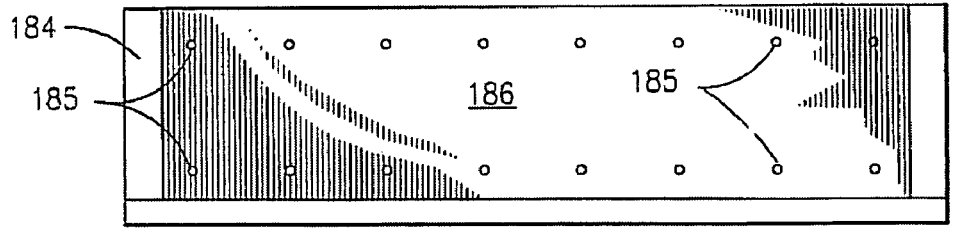
FIG. 10 is a front view in elevation of the front wall of the cargo bed insert.

The construction of front wall 180 is shown in FIGS. 9 & 10 and its location in the cargo bed insert may be appreciated with general reference to FIGS. 1b, 4a-4b & 5a-5c. Front wall 180 is situated forwardly of a transversely extending, and forwardly-ramped beam 182 (See also FIG. 11). Wall 180 projects upwardly from a front edge margin of plywood panel 120 and spans between left and right elongated beams 142, 162. Front wall 180 includes an upstanding interior wall 184 which is fastened to a 2×3 transverse beam 183. Beam 183 is, itself, is secured to the decking 120 by suitably positioned ones of the deck screws 128—that is, the two lowermost rows in FIG. 6a. Wall 184 is also constructed of 2×10 lumber so that it is at the same level as left outer wall 144 and right outer wall 164. When positioned as shown, lateral left and right edge margins of interior wall 184 abut the forward ends of left and right outer walls 144 and 164 and is fastened to them by suitable deck screws. A lip 187 is a formed as a metal height transition piece that stops small loose items such as sand, gravel or landscape mulch from lodging in between the front of the cargo bed assembly and the front wall of the factory installed cargo box. This feature can be accomplished using the "metal height transition flashing" as shown in the drawing, or a simple increase in height of the front box wall to eliminate the space where loose items could be lodged. A metal fascia panel 186 of reduced transverse width is fastened to interior wall 184 by deck screws (generally 185) and faces the rear of the utility vehicle's seat 30 when the cargo bed is inserted.

A pair of first repositionable load beams 171(1) and 171(2) may be removably fastened to wall 184 as shown in FIG. 11. To this end, interior wall 184 has transversely spaced apart pairs of upper and lower bores 173, each of which receives correspondingly sized threaded rod coupler 174 that is welded to the metal fascia panel 186 at one end and mounted flush with the rear surface of wall 184 at the other end. Correspondingly spaced apart bores are formed through repositionable beams 171(1) and 171(2), such that eye bolts 175(1)-175(4), can extend through beams 171(1) and 171(2) to threadedly engage vertically spaced apart ones of upper and lower rod couplers 174. In this manner, if desired, one or more of beams 171(1) & (2) can be fastened to wall 184 at various locations therealong. Unused ones of bores 173 are capped, each with an associated capping washer and bolt (generally 176) to prevent the ingress of debris or other particulates.

A preferred construction for tailgate 190 is now described with reference to FIGS. 12 & 13. Tailgate 190 is preferably also an assemblage and includes an exterior wall 192 that is provided with a plurality of upper and lower bores 193, each of which also receives an associated threaded rod coupler 194 which is flush mounted. A geometrically congruent, but thinner, metal fascia board 195 is secured to wall 192 by deck screws 196 and has the rod coupler's 194 welded thereto as before. As mentioned, the tailgate assembly may also be provided with repositionable beams 172(1) and 172(2), as shown in FIG. 13. Bores 193 are alignable with corresponding bores formed through optional beams 175(5) and 175(8) so that eye bolts 176(1)-176(4) can be used to fasten the option load beams at various locations along outer wall 192. Unused ones of bores 193 are capped, each with an associated capping washer and bolt (generally 197) to prevent the ingress of debris or other particulates.

With continued reference to FIGS. 12 & 13, tailgate 190 also includes a transverse 2×3 beam 198 formed from 2×4 lumber, and to which wall 192 is fastened via deck screws 199. Wall 192 is preferably mounted to a forward edge margin of the beam 198's upper surface. Each of the left and right ends 202 and 204, respectively, of wall 192 has an associated beveled chamfered surface portion.

Figure 14A:
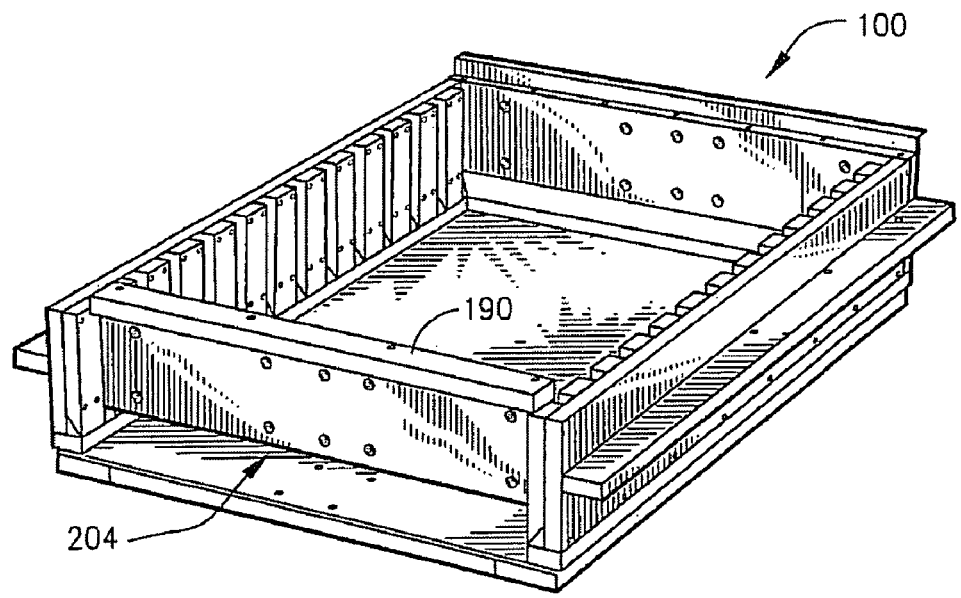
FIG. 14a is an exploded perspective view of the cargo bed insert and shows the ability for the tailgate to be inserted in an inverted position.

More particularly, left end 200 has an associated left beveled surface 201, while right end 202 has an associated right beveled surface 203. Thus, when the tailgate is inserted between transversely opposed slots of the left and right side beds as shown in various ones of the figures, this beveling follows the surface contour of the left and right ramped rails 146 and 166, respectively. This helps to prevent the accumulation of small particulates, such as drainage rock and sand within slots between the various spacer posts during use. Also, once the tailgate is inserted, such as shown in various ones of the figures, transverse beam 198 provides a lower barrier to substantially prevent spillage of the particulate material out the rear of the cargo bed insert 100. On the other hand, at times it may instead be desirable to have a small gap between the tailgate 190 and the decking 120 (perhaps to permit installation of the tailgate without the need to remove sand or gravel that has been loaded without the tailgate in the normal position or to allow for a more controlled dumping or even spreading of material at a job site). For such situations tailgate 190 is designed to be turned upside down in an inverted position as shown in FIGS. 14a & 14b and then inserted into opposed slots. When oriented in this manner, a small gap 204 is present between the tailgate wall 192 and decking 120.

Figure 15A:
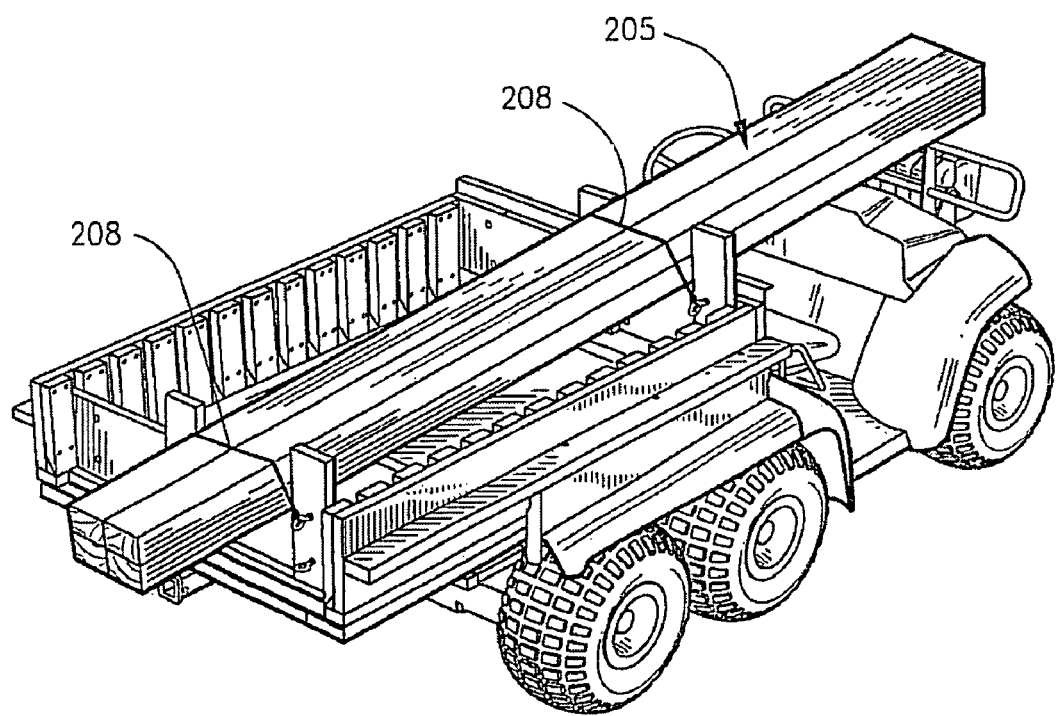
FIGS. 15a-15c are elevated rear perspective views for illustrating the capability of the cargo bed insert's accessory vertical load beams to support a variety of elongated construction material.
Figure 15B:
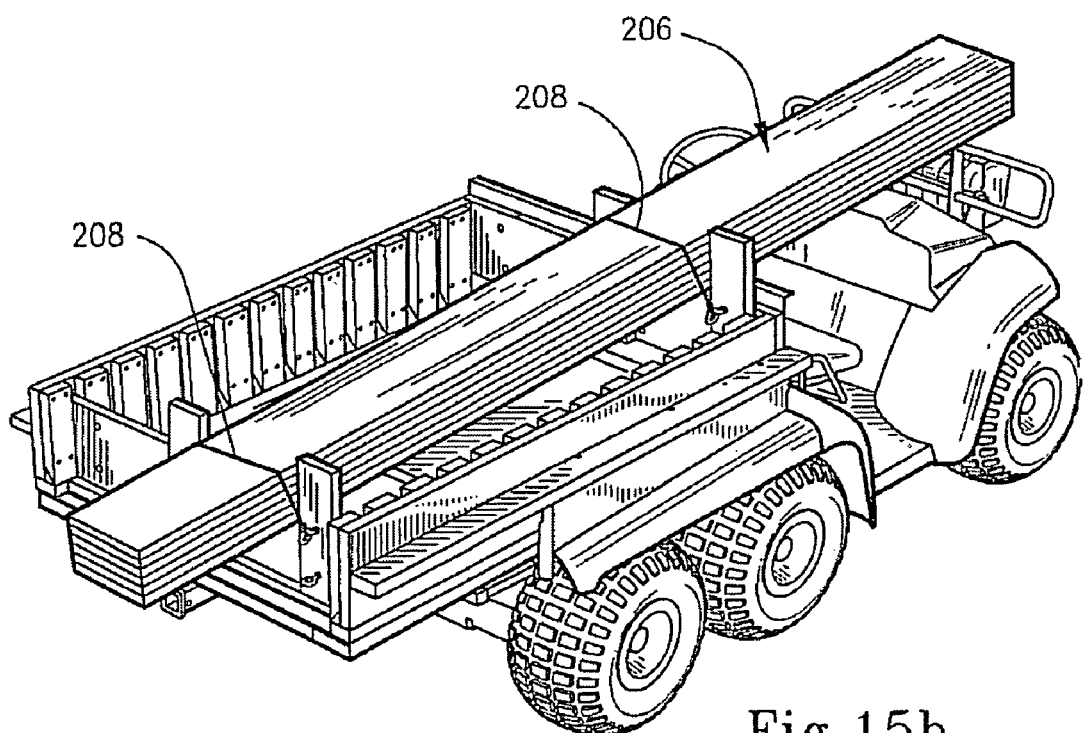
Figure 15C:
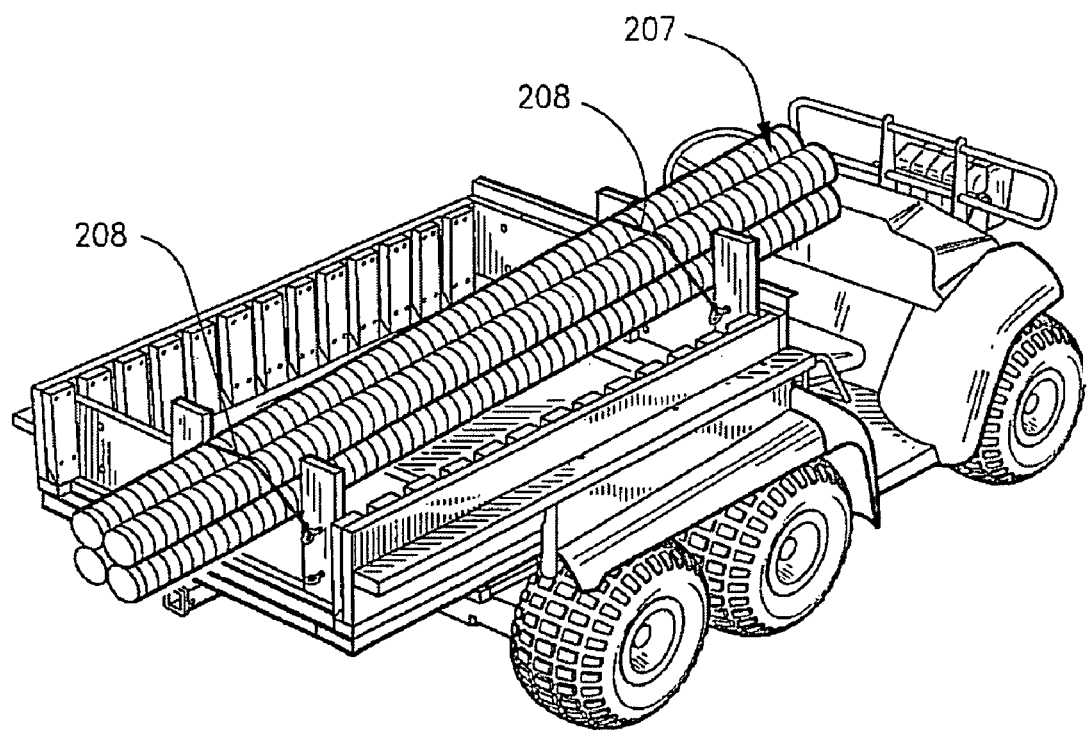

With an understanding of the preferred construction for the cargo bed insert's front bed wall and repositionable tailgate, the purpose of the optional vertical load beams 171(1) & (2) and 172(1) & (2) may now be better appreciated. These load beams can be used in conjunction to allow the cargo bed insert to accommodate transport and use of elongated construction materials, which otherwise might not stay in place in the short bed installed from the factory. Since elongated construction materials are typically long and heavy they may be too cumbersome or difficult to safely load and transport—hence, the optional provision of vertical load beams with integrated tie down points (i.e. eye bolts). Various representative loads 205-207 are respectively shown in FIGS. 15a-15c such as four 4×6×12 landscape timbers (FIG. 15a), six 2×12×16 structural lumber (FIG. 15b) and plastic drain pipes (FIG. 15c). As may also be seen in these figures, the eye bolts serve as attachment locations for tie down straps (generally 208). Externally located eyebolts could also be provided at suitable locations on the cargo bed insert's left and right side walls to provide for additional, or alternative, attachment locations. One manner of accomplishing this is depicted, for representative purposes, in FIG. 15d wherein a threaded rod coupler 174 is inserted into a pre-drilled hole (not shown) formed through a selected spacer post 148 and upstanding outer wall 144. An external eye bolt 175(e) threadedly engages the coupler 174 and prevented from dislodging via capped nuts 177(1) and 177(2). It is contemplated that, with extended periods of use, the threaded rod coupler may begin to freely spin within the pre-drilled hole, thereby preventing it from threadedly engaging the eyebolt. To prevent this, a small hole could be drilled in the coupler such that a set screw or pin could be inserted therein from the outside to prevent rotation of the coupler inside its confines.

Figure 16A:
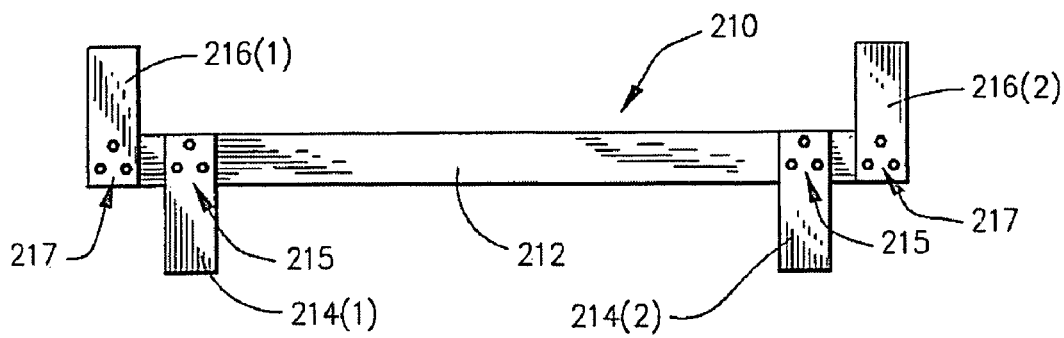
FIG. 16a is a front plan view of an optional horizontal load beam accessory.
Figure 16B:
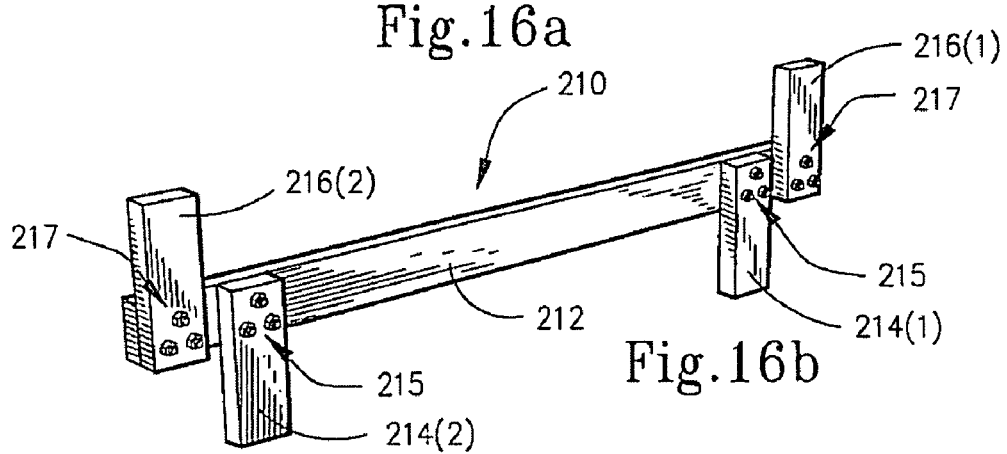
FIG. 16b is a rear perspective view of the horizontal load beam.
Figure 17A:
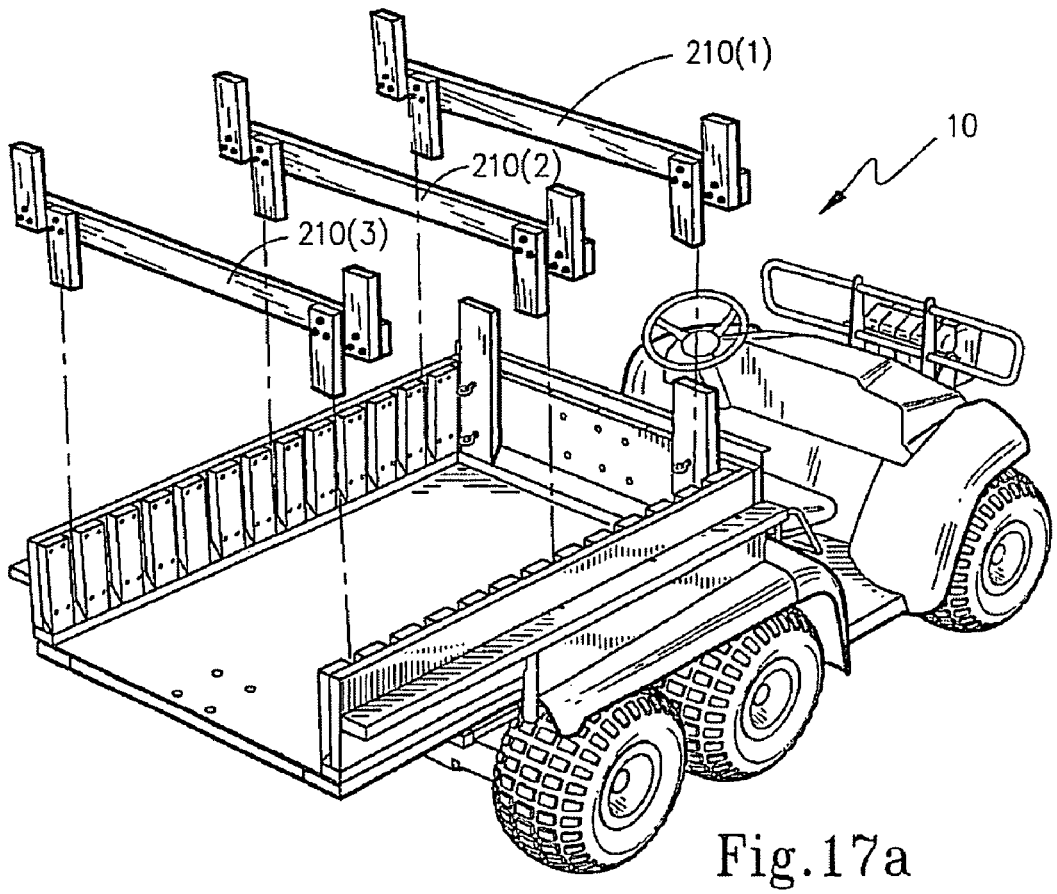
FIG. 17a is an exploded perspective view of the utility vehicle, and illustrates the removable insertion of a plurality of horizontal load beams.
Figure 17B:
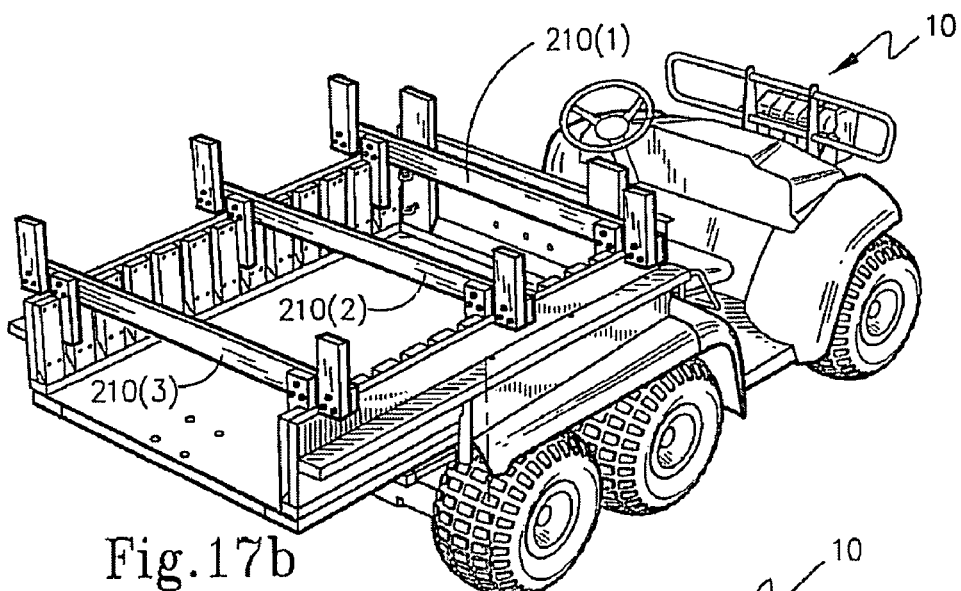
FIG. 17b is an exploded perspective view as in FIG. 18a, and shows the horizontal load beams in an inserted position.
Figure 17C:
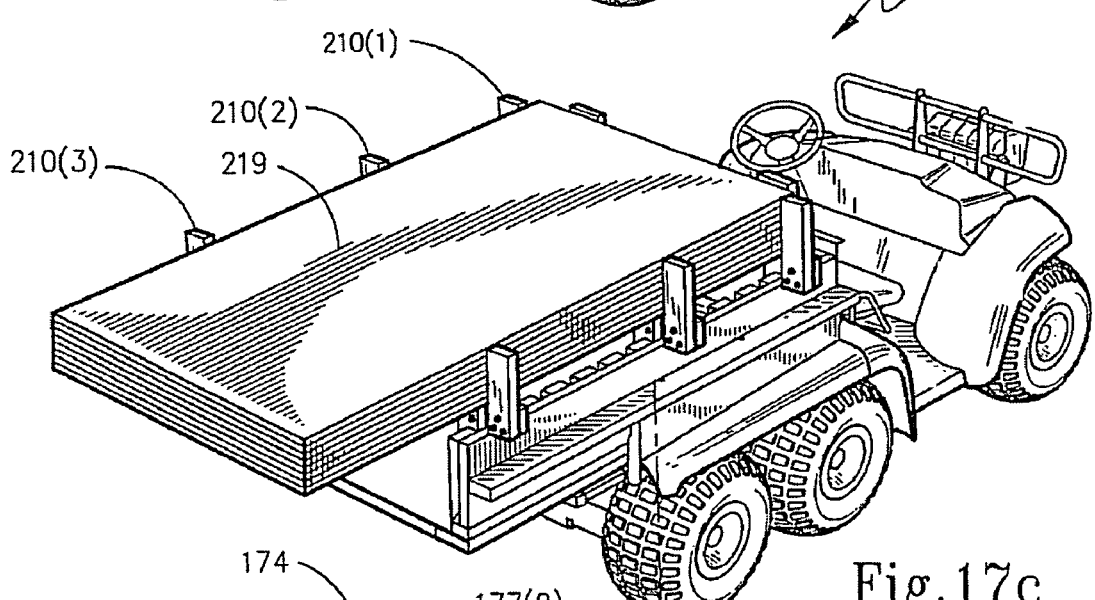
FIG. 17c is a perspective view representatively showing the horizontal load beams supporting sheets of plywood.
Figure 17D:
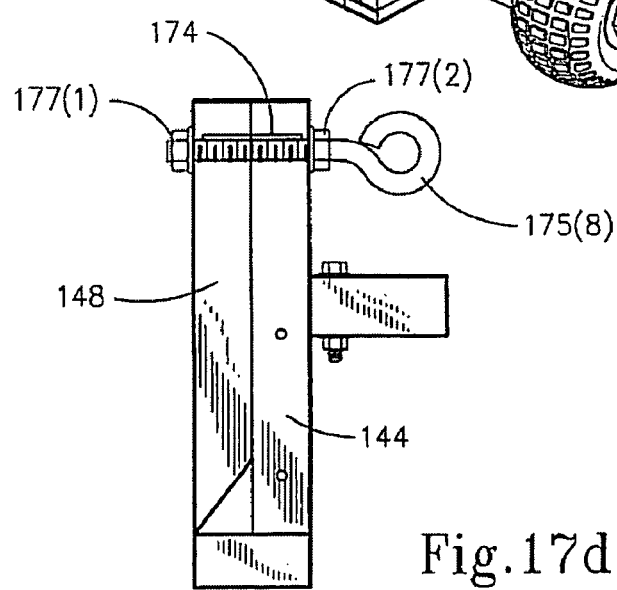
FIG. 17d is a rear view in elevation for diagrammatically illustrating the attachment of an external eyebolt to the cargo bed insert.

FIGS. 16(a) and 16(b) show another optional accessory item in the form of a horizontal load beam assembly 210. Load beam assembly 210 includes a horizontal load bearing beam 212 to which is fastened a pair of inner, downwardly depending legs 214(1) and 214(2) and a pair of outer, upwardly projecting arms 216(1) and 216(2). Legs 214(1) and 214(2) are secured to transverse beam 212 by associated nut and bolt fasteners (generally 215), while arms 216(1) and 216(2) are secured to transverse beam 212 by associated nut and bolt fasteners (generally 217). Left and right legs 214(1) and 214(2), respectively, are positioned for insertion into laterally opposed ones of the slots 154 and 174 on the left and right side beds. Left and right arms 216(1) and 216(2) are preferably spaced apart a sufficient distance so that, when a plurality of horizontal load beam assemblies 210(1) through 210(3) are used in conjunction with one another as shown in FIGS. 17a-17c, they can support a stacked load 219, such as standard dimensioned plywood panel sheets or drywall. Additionally, large windows or doors that need transport from the delivery point to the area where they will be installed can also be accommodated by the cargo bed insert in conjunction with the appropriate selection of horizontal load beams. While the beams shown in various figures are a suitable width for the transport of industry standard 4'×8' panels the invention is not limited to this size. Horizontal load beams with widths shorter and longer of suitable dimensions are contemplated.

An optional debris shield 220 may be employed with the cargo bed insert 100, as shown in FIG. 18. Debris shield 220 can protect the utility vehicle's seats and/or occupants in a variety of situations, such as when a machine is being used to load the cargo bed insert. Debris shield 220 is insertable into the box's interior, namely, between forwardmost opposed slots 154(13) and 174(13) which are defined between wall 184 and forwardmost spacer bars 148(13) and 168(13), respectively (see also FIG. 5a). Debris shield 220 may be constructed of any suitable material, such as wood, plastic or the like. The preferred construction of debris shield 220 may be appreciated with reference to FIGS. 18 and 19a-19c.

Figure 19C:
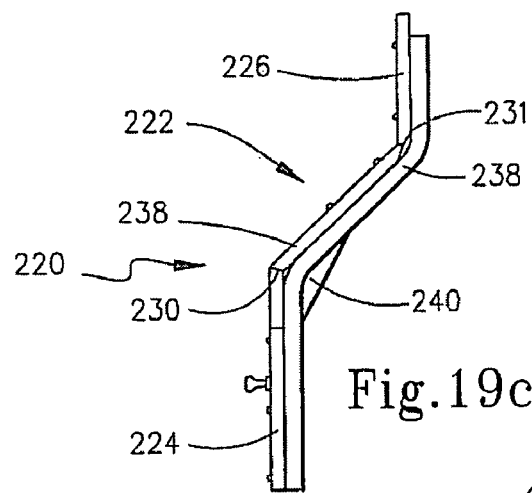
FIG. 19c is a left, passenger side view of the debris shield.

Debris shield 220 has a wall construction 222 that is formed by three wall sections, each of which is preferably ¾ plywood. Wall construction 222 includes vertical sections 224 and 226 and aforwardly-sloped medial section 228 extending therebetween. As seen in FIG. 19c, the various wall sections are beveled so that junctions 230 and 231 are formed where medial wall 228 meets walls 224 and 226. Lower wall section 224 is received within the cargo bed's interior and includes left and right shoulders 232 and 233, respectively, which rest against the upper surfaces of side bed walls 144 and 164. Lower section 224 includes a handle 234 which may be employed in conjunction with an aperture 236 formed through upper wall section 226 to facilitate insertion and removal of the debris shield. Disposed about a peripheral margin of wall construction 222 is 1" steel reinforcement tubing 238 which prevents the debris shield from deflecting forward during use. Tubing 238 is secured to wall construction 222 by a plurality of self-tapping metal screws (generally 240 shown in FIG. 19b). Reinforcement tubing 238 generally follows the transitions of the wall sections and left and right gussets 240 and 241, respectively, are included to provide additional stability to the tubing as it transitions from lower wall section 222 to medial wall section 224.

Figure 20:
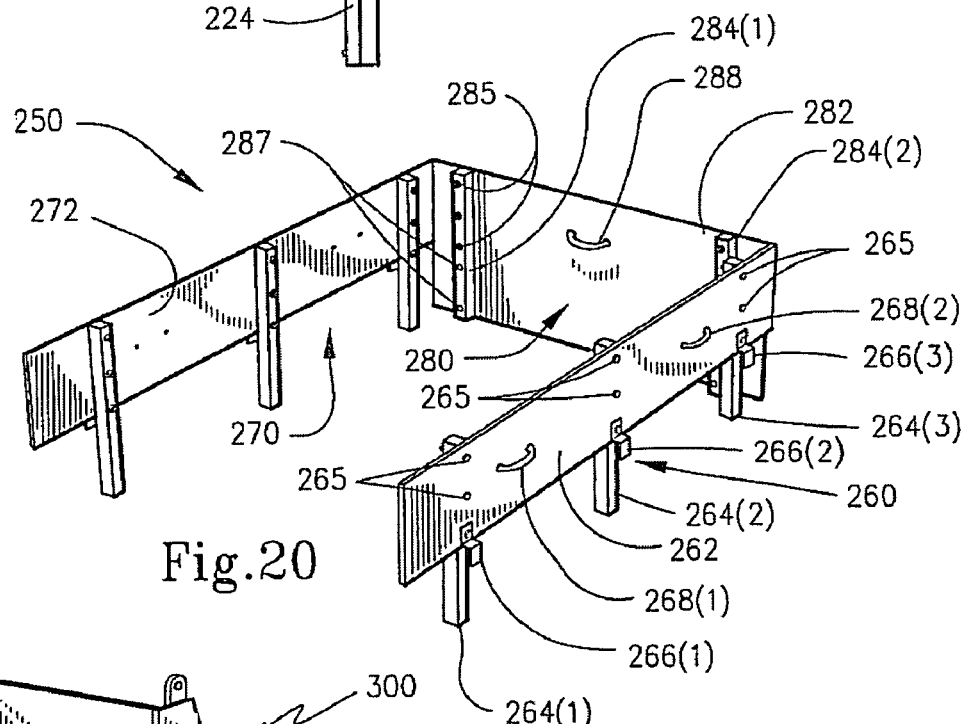
FIG. 20 is a rear perspective view showing an optional landscape box extension for the cargo bed insert.
Figure 21:
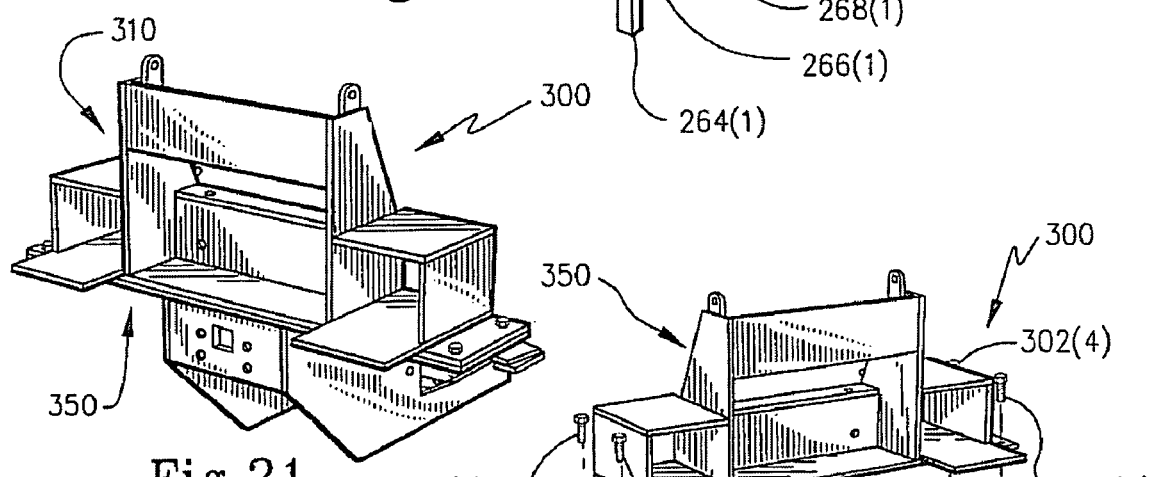
FIG. 21 is a perspective view of the front end mounting assembly.
Figure 22:
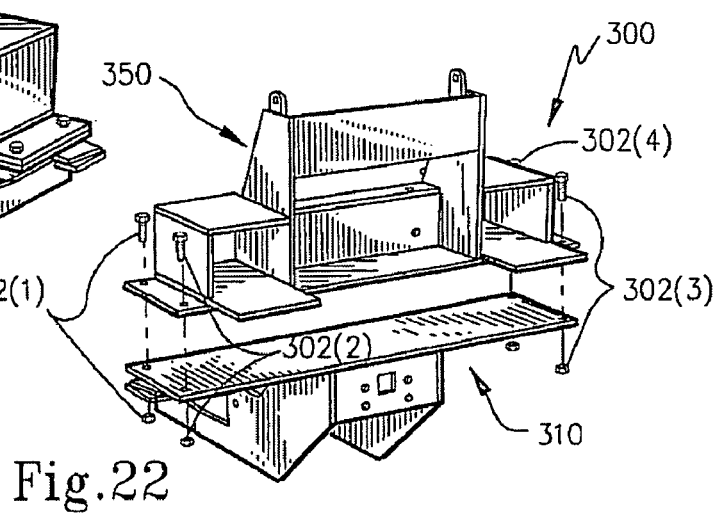
FIG. 22 is an exploded perspective view of the front end mounting assembly.

Reference is now made to FIG. 20 which shows an optional landscape box extension 250 for use with the cargo bed insert. The landscape box extension 250 includes a plurality of elevation panels which, when installed, raise the height of the cargo bed insert so that it can accommodate loads of greater volume, such as trees, shrubbery, sand and the like. More particularly, landscape box extension 250 includes a left (or passenger's side) elevation panel assembly 260, a right (or driver's side) elevation panel assembly 270 and a front elevation panel assembly 280. It is contemplated that the panel assemblies will be used in conjunction with one another, such that left and right panel assemblies 260 and 270 may be secured to the front elevation panel assembly 280 by any suitable means, such as screwing, gluing or the like. Alternatively, the panel assemblies can be separate units which are individually installed into the cargo bed insert so that a user can elect to use one or all of them at any given time as he/she so chooses.

Left elevation panel assembly 260 includes a wall panel 262 and a plurality of legs 264(1)-264(3) secured thereto via nut and bolt fasteners (generally 265) so that legs downwardly depend from the wall panel. Proximate to each leg is an associated mounting clip 266(1)-266(3), respectively. Handles 268(1) and 268(2) are mounted to the wall's exterior between adjacent ones of the legs to facilitate insertion and removal. Upon insertion, each of legs 264(1)-264(3) is received within an available slot 154 associated with the cargo bed insert's left sidewall (See FIG. 5a). When the legs are dropped down into the slots, the mounting clips 266(1)-266(3) then overhang the left sidewall's upstanding wall 144 to provide for a more snug fit.

In similar fashion, landscape box's right elevation panel assembly 270 has a wall 272 and associated legs 274(1)-274(3), mounting clips 276(1)-276(3), and handles (not shown) such that it is removably insertable into available slots within the cargo bed insert's right sidewall behind the driver's side of the vehicle. Wall panels 262 and 272 are each preferably 2×10 lumber so that, upon insertion into the cargo bed insert, they are seated respectively on the upper surfaces of the insert's left and right walls 140,160 to provide an additional 10" of elevation.

Front wall elevation assembly 280 includes a front wall panel 282 provided with an inwardly disposed handle 288. Front wall panel 280 has a height which is equal to the height of the cargo bed insert's front wall assembly, plus and additional 10" so that the front wall panel 282 becomes elevated to the same height as the left and right elevation panels 262 and 272. In addition, front wall elevation panel assembly 280 has laterally opposed beams 284 (1) and 284(2) secured to it by nut and bolt fasteners (generally 285). Bores 287 are formed through each of these beams in order to accommodate the optional vertical load beams discussed earlier with reference to FIGS. 9-11.

Figure 23A:
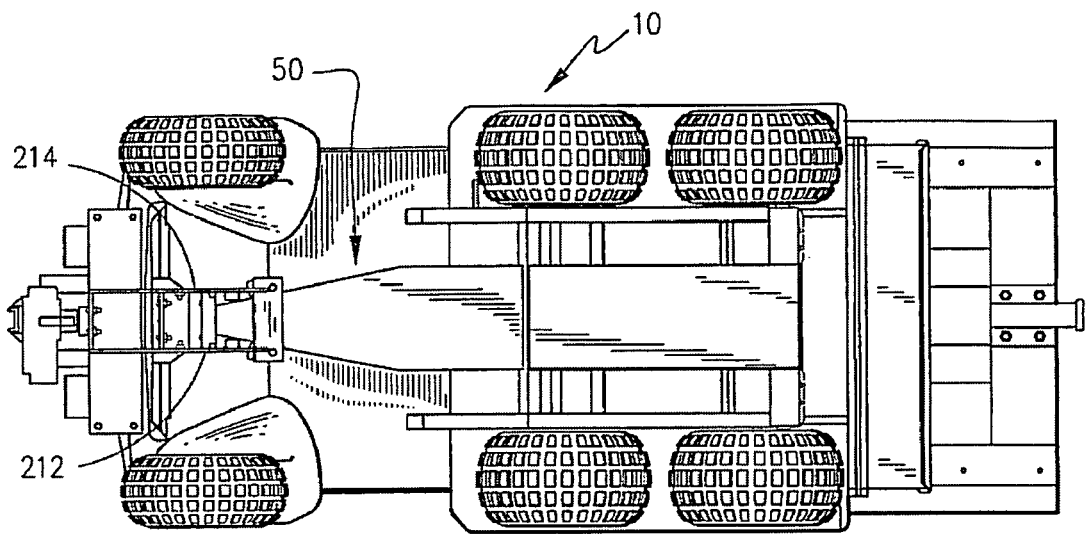
FIG. 23a is a bottom plan view of the utility vehicle.

Having described the cargo bed insert, reference is now made to FIGS. 21-34 to describe the front end mounting assembly which may be used in conjunction therewith. Mounting assembly 300 is introduced in FIGS. 21 & 22 and includes a lower portion 310 and an upper portion 350 which are securable together by cooperative nut and bolts fasteners, generally 302(1)-302(4). Lower portion 310 and upper portion 350 are preferably welded steel components of suitable thickness, e.g. ⅜" hot rolled steel. Lower portion 310 is securable to the utility vehicle's lower framework, generally designated as 50, as illustrated in FIG. 23a and the exploded view of FIG. 23b. More particularly, utility vehicle 10 comes factory-equipped with a plurality of mounting brackets or plates. Lower portion 310 may be conveniently fastened to these existing brackets or plates. With general reference to FIGS. 23-25, 26a & 26b, lower portion 310 includes geometrically congruent left and right arms 312 and 314 which are parallel to one another and extend downwardly from a base platform 316. A plurality of mounting plates span between left and right arms 312 and 314. A winch mounting plate 318 spans between upper left arm portion 313 and upper right arm portion 315. A plurality of mounting holes 319 are formed through plate 318 so that it can accept a winch accessory, as described below with reference to FIG. 27a.

Spanning between left and right elbow portions 321 and 323, respectively, is a first vehicle mounting plate 320 having associated mounting holes 325. As shown in FIG. 23, the vehicle's under body 50 includes a first forwardly disposed under carriage mounting bracket 52 that is provided with longitudinally extending mounting holes 51 and transversely extending mounting holes 53. Longitudinal mounting holes 51 are alignable with mounting holes 325 formed through the lower portion's first vehicle mounting plate 320. Transverse mounting holes 53(1) and 53(2) are alignable with corresponding transverse holes 327(1) and 327(2) formed through left and right elbow portions 321, 323.

Figure 23B:
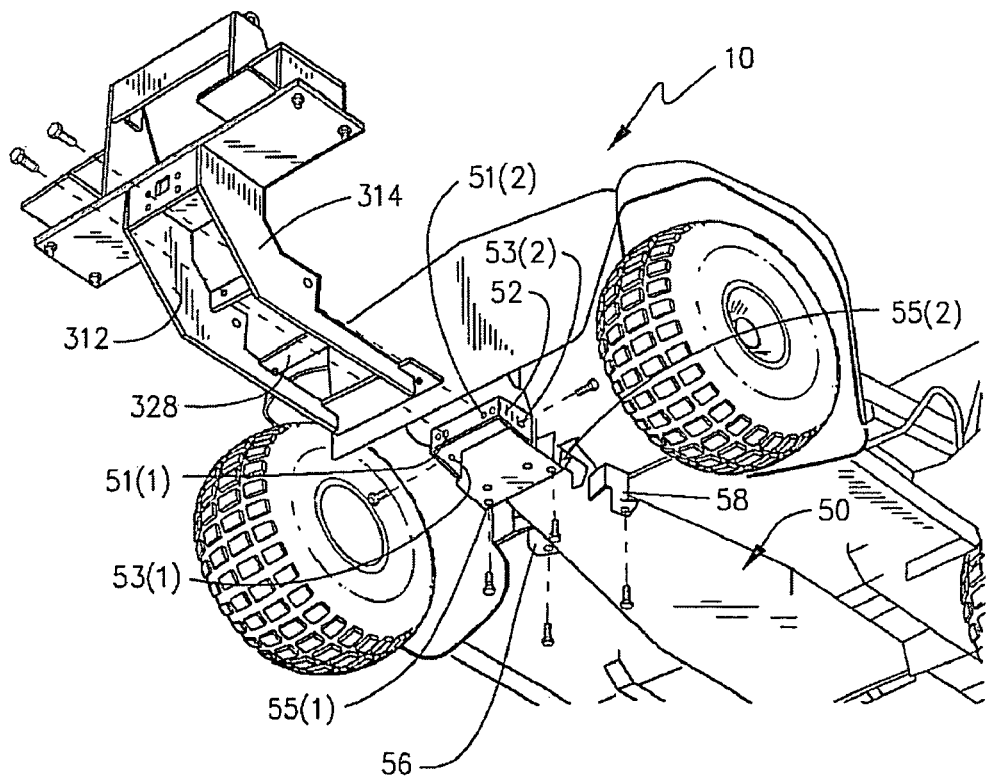
FIG. 23b is an enlarged, exploded perspective view of a portion of the vehicle's undercarriage for illustrating the attachment of the front end mounting assembly.
Figure 27B:
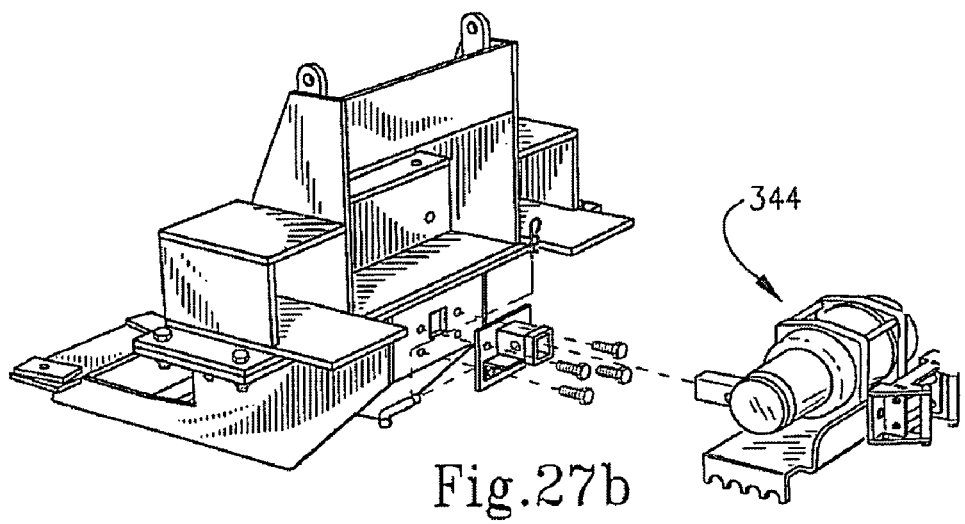
FIG. 27b is an exploded front perspective view showing the attachability of a winch accessory to the front end mounting assembly.
Figure 28:
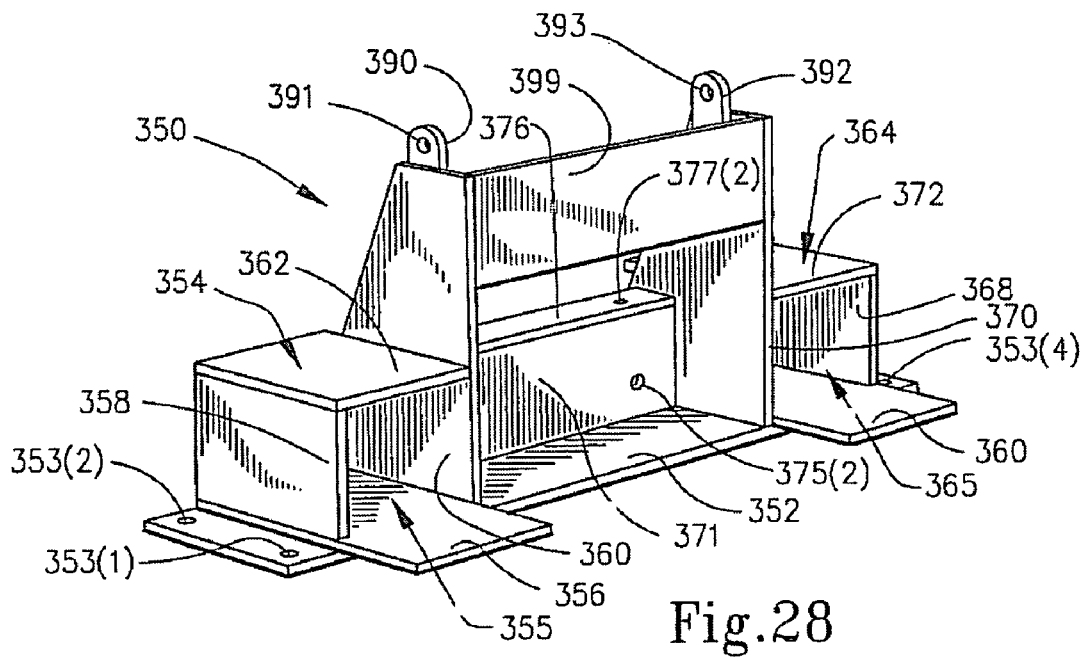
FIG. 28 is a front perspective view of the front end mounting assembly's upper portion.
Figure 29:
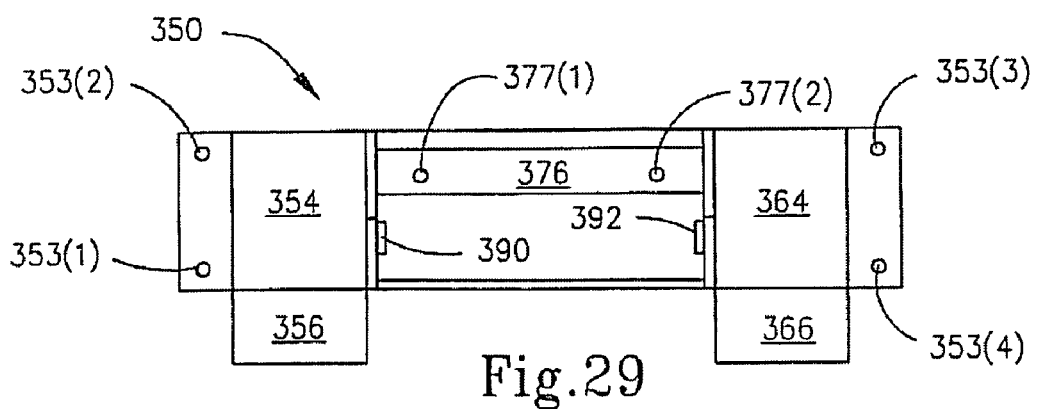
FIG. 29 is a top plan view of the upper portion of the front end mounting assembly.
Figure 34:
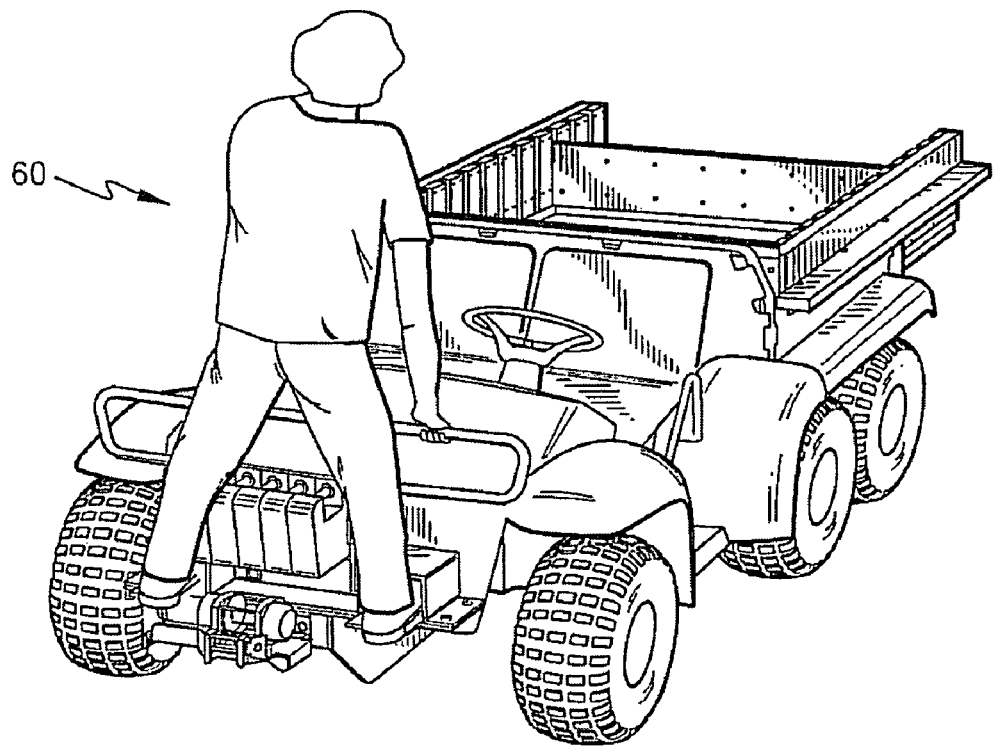
FIG. 34 is a perspective view of the utility vehicle showing various ones of the above figures, and illustrating the capability of a user to stand on the front end mounting assembly to provide additional counterweight as desired.

A second vehicle mounting plate 328 (FIGS. 23a & b) spans between left and right forearm portions 329 and 331, respectively. Second mounting plate 328 includes mounting holes 333(1)-(2) which are alignable with corresponding holes 55(1)-(2) formed on a second under carriage mounting plate 54 associated with vehicle 10. A third, terminal mounting plate 330 spans partially between distal end portions 333 and 335, respectively, of left and right arms 312 and 314. Third mounting bracket 330 is seated within left and right notch portions 337 and 339 and includes a lower platform 340, and left and right dampening pads 341 and 342, respectively. Mounting hole 343(1) is formed through base platform 340 and left pad 341. A right mounting hole 343(2) is formed through platform 340 and right pad 342. Mounting holes 343(1) and 343(2) are alignable with corresponding holes 57(1) and 57(2) formed on left and right mounting brackets 58(1) and 58(2) of the vehicle's under carriage. Once all of the various vehicle mounting holes associated with left and right arms 312 and 314 have been aligned with corresponding mounting holes on the vehicle's under carriage 50, lower portion 310 may be securely fastened to the under carriage via suitable fastening bolts, generally 60, as illustrated in FIGS. 23a & 23b. Once front end mounting assembly 300 has been mounted onto the utility vehicle 10 as described, an optional winch accessory 344 can be bolted to the winch mounting plate 318, as shown in FIG. 27a. For the 6×4 Gator™ of the exemplary embodiments described, the currently available winch accessory is available in various sizes and pulling capacities from multiple suppliers. FIG. 27b shows the current version of the winch 344 for use with a standard 6×4 Gator™. Winch 344 is mounted to a winch plate 345. Together, winch 344 and wing plate 345 are mounted, via bolts 348, to the lower portion of front end mounting assembly 300 via a receiver tube assembly 346. Winch 344 is currently available from John Deere as Part No. 8003M. The winch plate 345 is available as Part No. VG10902, and the receiver tube assembly 346 is available as Part No. BM19972.

The front end mounting assembly's upper portion 350 is described now with reference to FIGS. 28-32. Upper portion 350 includes a base platform 352 that is provided with plurality of mounting holes 353(1)-353(4) which receive fasteners, so that upper portion 350 can be secured to the lower portion as described above with reference to FIG. 22. Left and right stirrups 354 and 364 are supported above base plate 352. Left stirrup 354 includes a pedestal 356, a left sidewall 358, a right sidewall 360 and a cover plate 362. Right stirrup 364 similarly includes an associated pedestal 366, an outer right wall 368, an inner left wall 370 and a cover plate 372. Left and right foot receiving regions, 355 and 365 respectively, are thus formed.

Spanning interiorly between walls 360 and 370 are vertical and horizontal brush guard mounting plates, 374 and 376 respectively. Vertical plate 374 includes mounting holes 375(1) and 375(2), while horizontal mounting plate 376 has associated mounting holes 377(1) and 377(2). As shown in FIG. 32, this allows the front end mounting assembly 300, and specifically its upper portion 350, to have a brush guard accessory 380 fastened thereto. Brush guard accessory 380, which for the 6×4 Gator™ is available as accessory Part No. BM21537, includes left and right angle brackets 382 and 384, respectively, which are provided with mounting holes. These mounting holes are alignable with the upper portions mounting holes 375(1) and (2), 377(1) and (2), so that brush guard 380 can be fastened thereto via suitable bolt fasteners 383(1)-384(4) and serve as a handlebar for a person As also shown in various ones of figures, the upper portion of wall 360 includes a left lobe plate 390 welded thereto, and the upper portion of right wall 370 includes a right lobe plate 392 welded thereto. Left lobe plate 390 includes an eyelet 391 that is axially aligned with an associated eyelet 393 formed through right lobe plate 392. As illustrated in FIGS. 27a & 27b, a weight securement rod 394 is sized and adapted to pass through eyelets 391 and 393. Weight securement rod 394 has a length "$L_H$" which is greater than the distance between lobed brackets 390 and 392. Left and right apertures 395 and 397, respectively, are formed through weight securement rod 394. Once inserted, left and right cotter pins 396(1) and 396(2) can be inserted through the apertures 395 and 397 to prevent dislodgement of the weight securement rod 394. Once inserted, one or more weights (generally 398) can be suspended from vertical mounting plate 399 and retained by weight securement rod 394, such that the weights span between walls 360 and 370 and are prevented from rotating counter clockwise in FIG. 27a by virtue of the slot 398(1) used to allow hanging of the weights on vertical mounting plate 399. Additionally, weight rod 394 engages the ledge 398(2) by passing over the ledge in close proximity to prevent accidental dislodgement of the weights in rough terrain situations. Weights 398 are also accessory items available from John Deere as Part No. R66949. Such weights are commonly used in conjunction with lawn and garden tractor vehicles, but it has been found that they can be used on the front end mounting assembly described in order to counter the weight of the utility vehicle's cargo load and installed options and maintain a low center of gravity. The artisan would recognize that a longer vertical mounting plate 399 and a longer weight securement rod 394 could be employed so that additional weights could be suspended externally of the upper portion's lobe plates 360 and 370 on either or both of the left and right sides. The artisan would recognize that extension of vertical mounting plate 399 and weight securement rod 394 would be consistent with the intent of the invention and would be contemplated in size and exact length and implementation as required to produce an appropriate counterweight in reference to the options described herein. Weights beyond the 5 units shown in FIG. 27a can provide additional offset weighting, for example, during transport of an individual situated in a transport apparatus on either the driver side or passenger side of the vehicle. Further, as shown in FIG. 35 if needed, additional weight can be provided by having a user 60 stand on the front end mounting assembly with his/her left and right feet received within foot receiving regions 355 and 365 and with his/her hands grasping the brush guard 380.

Reference is now made to the remaining figures to describe an alternative embodiment for a cargo bed insert which can also be used separate, or in conjunction with, the front end mounting assembly described above to transport injured players. This embodiment of the cargo bed insert preferably utilizes the base John Deere Gator™ equipped with optional turf tires for significantly reducing the possibility of damage to the playing surface—whether natural grass or artificial turf—and an integrated electric lift for placing the cargo bed insert at a desirable angle to allow the player to be situated at an optimum angle based on the injury. When a Gator™ is equipped in such a manner, and further equipped with the player transport assembly described below, the vehicle becomes capable of transporting an injured player in comfort who has sustained one or more injuries related, for example, to the ankle, knee, tendons, thigh or hip. Of course, for more severe injuries which have been sustained an ambulance may be required as determined by trained medical staff, so that the injured player transport utility vehicle described herein is not intended as a substitute in such situations.

Figure 35A:
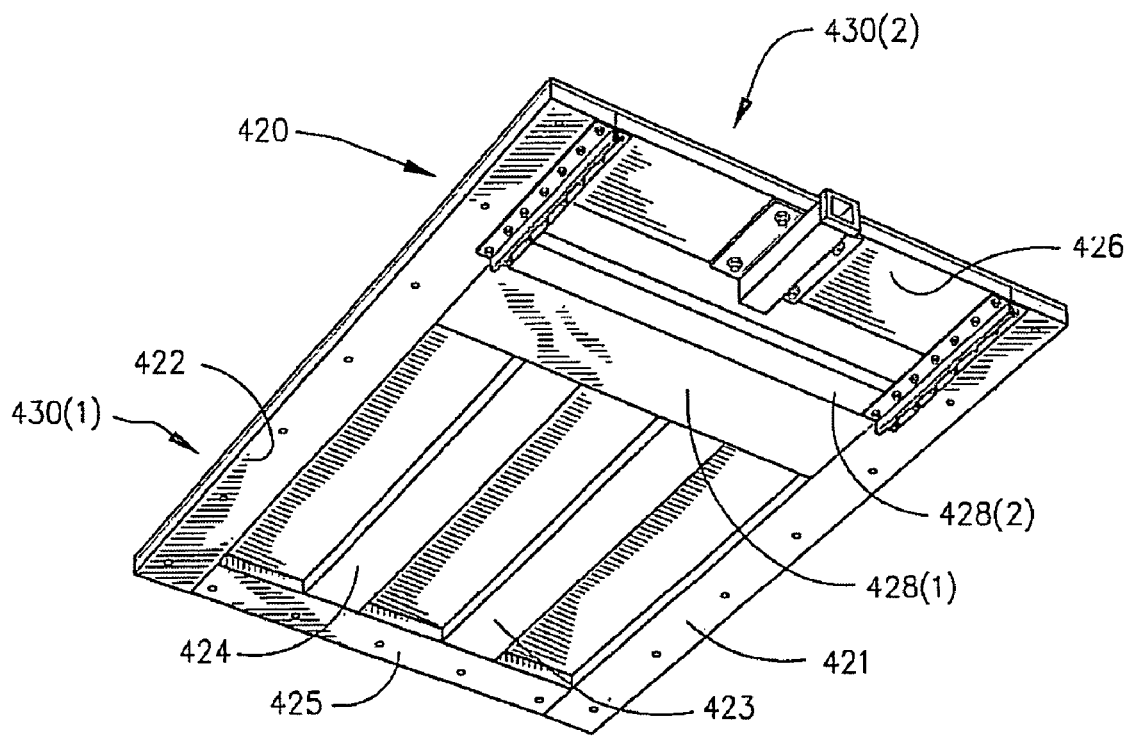
FIG. 35a is a bottom perspective view of a modified decking for accommodating a player transport assembly.
Figure 35B:
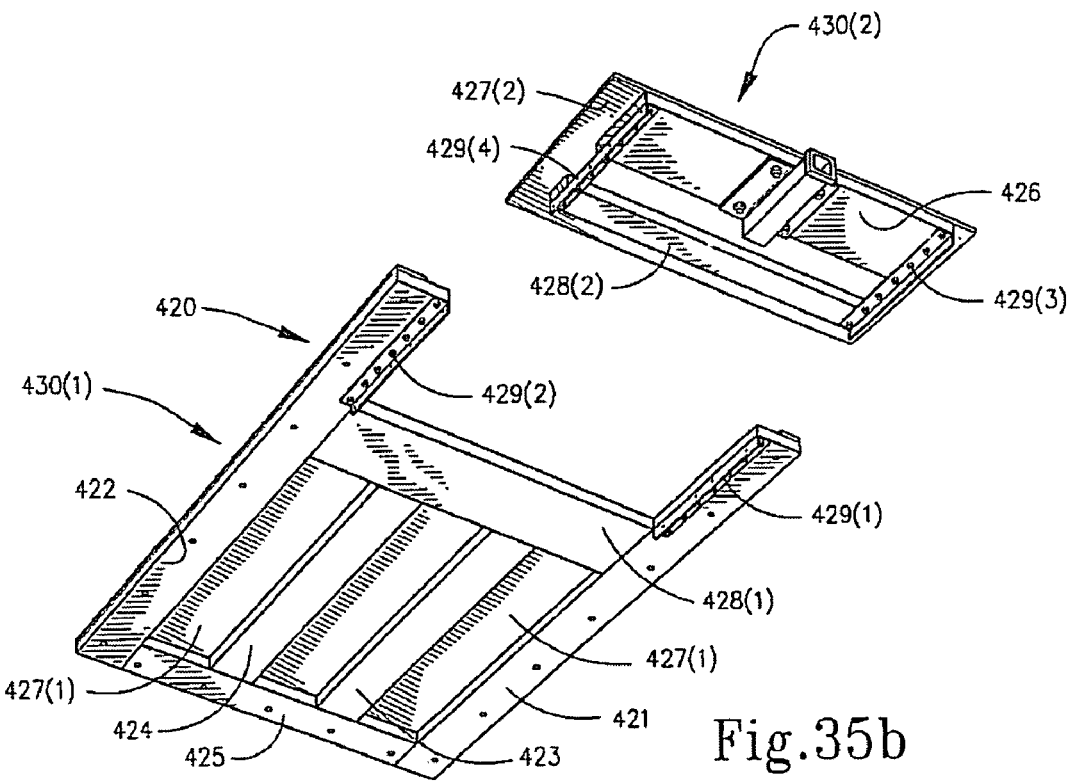
FIG. 35b is an exploded perspective view of the decking to illustrate the removability of its hitch panel portion.

Initial reference is made to FIGS. 35a and 35b which show a modified version of a decking 420 for a cargo bed insert. Decking 420 is similar to decking 120 discussed above but, here, includes a fixed portion 430(1) and a removable hitch panel portion 430(2). More particularly, decking 420 as above includes a pair of longitudinally extending left and right deck beams 421 and 422, respectively, a pair of longitudinally extending medial deck beams 423 and 424, and a pair of transversely extending front and rear deck beams 425 and 426, respectively. Rear transverse beam 426 is associated with the removable hitch panel section 430(2). Decking 420 additionally includes two medial, transversely extending beams 428(1) and 428(2). The ¾" thick plywood panel for decking 420 is comprised of two portions 427(1) and 427(2), as best seen in FIG. 35b. Angle brackets 429(1)-429(4) are mounted to the underside of the decking sections so that hitch panel portion 430(2) can be removably secured to the decking's primary section 430(1) by fasteners (not shown). Such fasteners preferably include matable nuts, bolts and washers.

With the removable hitch panel portion 430(2) in place as shown in FIG. 35a, it should be understood by the ordinarily skilled artisan that the revised cargo bed insert, despite having a modified decking 420, can function as described above and accommodate all of the available options. Thus, for example, while the modified decking 420 may be used for a utility vehicle in a sports environment, the available options will allow for use during the off season, or between games, by facility staff for purposes other than transporting injured players.

Figure 36:
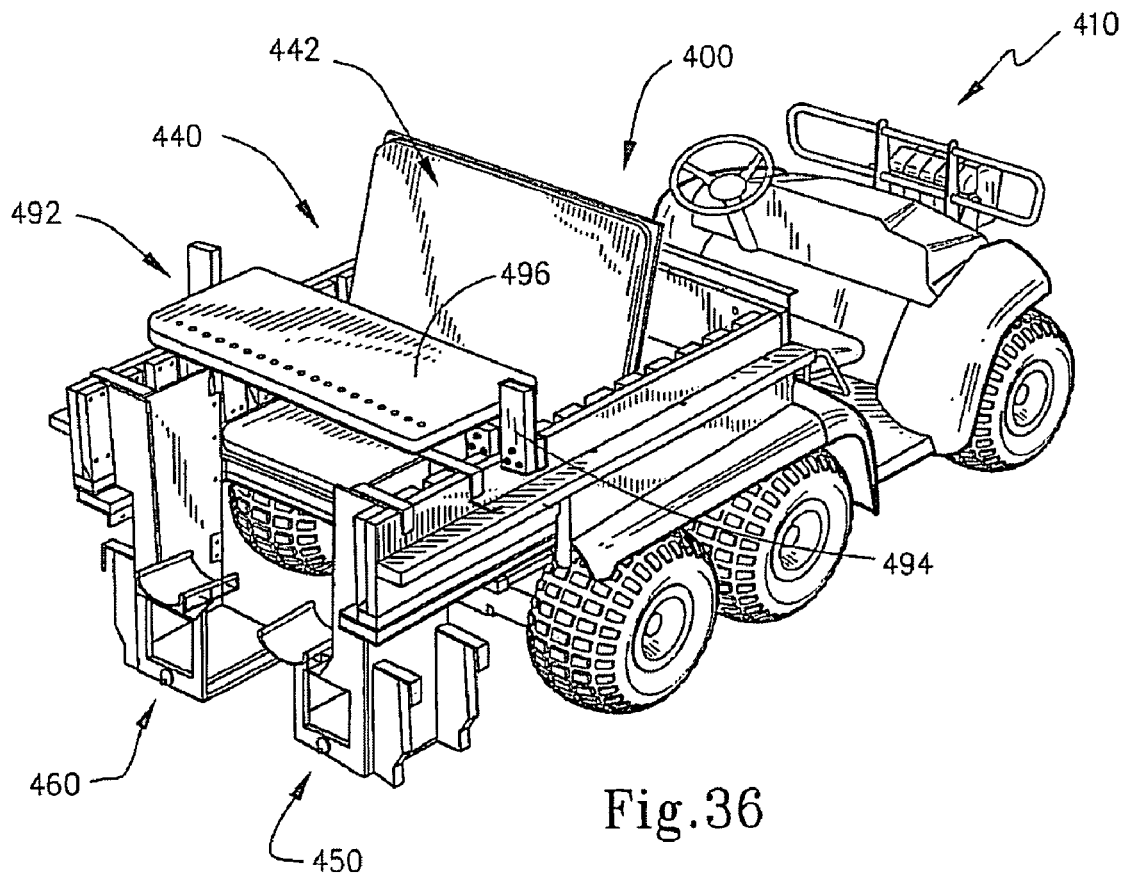
FIG. 36 is a rear perspective view of a utility vehicle provided with an alternative embodiment of a cargo bed insert and a player transport assembly disposed therein.
Figure 37A:
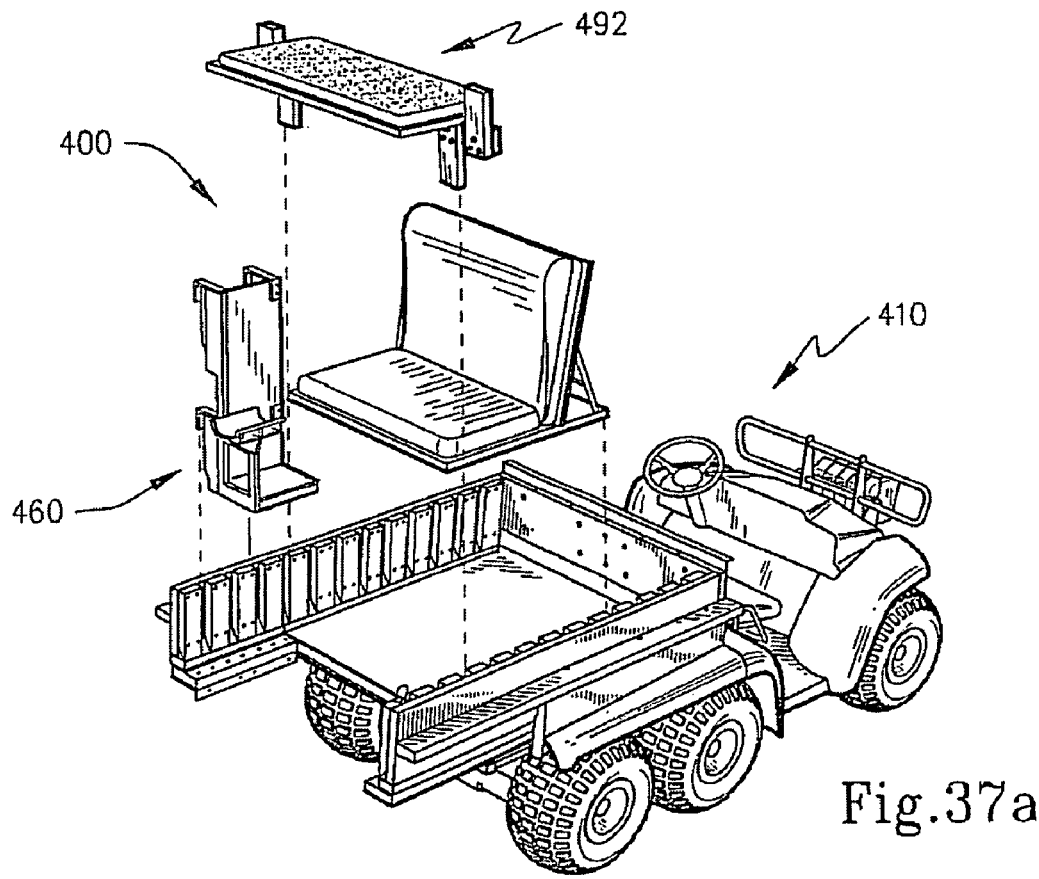
FIG. 37a is an exploded rear perspective view of the player transport assembly being inserted into the modified cargo bed insert.
Figure 37B:
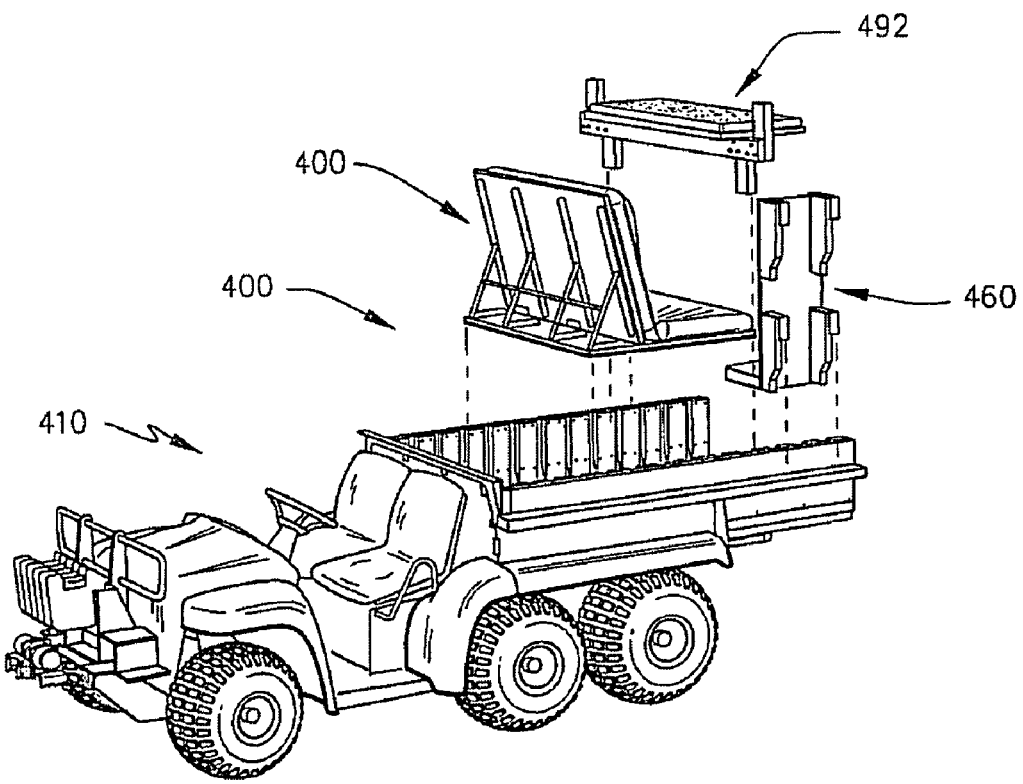
FIG. 37b is an exploded front perspective view of the player transport assembly being inserted into the modified cargo bed insert.

However, advantageously, once the hitch panel portion 430(2) is removed as is shown in FIG. 35b, a cargo bed insert 400 having such a modified decking 420 can be used to accommodate a player transport assembly 440, as perhaps best shown in FIGS. 36, 37a and 37b. In such a manner, the utility vehicle 410 can now serve as a "field ambulance" for injuries primarily from the waste down.

Figure 38A:
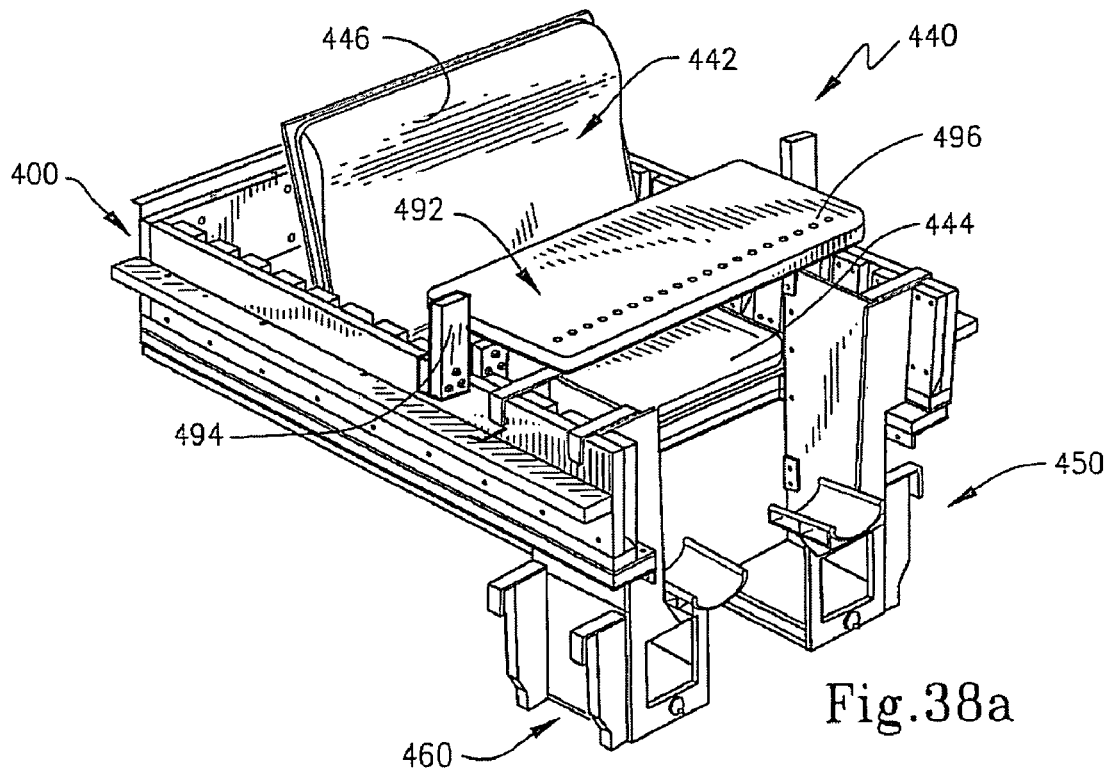
FIG. 38a is a rear perspective view (as viewed from the driver's side) of the cargo bed insert with the player transport assembly mounted therein.
Figure 38B:
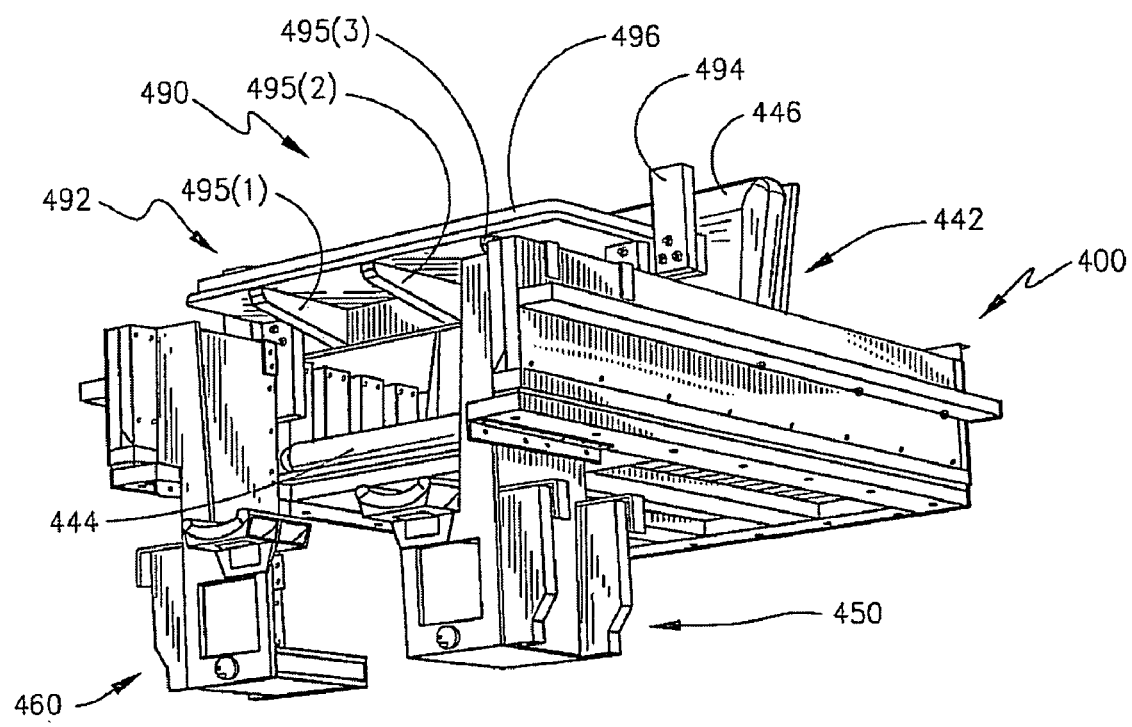
FIG. 38b is a bottom, rear perspective view (as viewed from the passenger's side) of the cargo bed insert with the player transport assembly mounted therein.

As the ordinarily skilled artisan will appreciate, player transport assembly 440 can be constructed from a broad variety of materials, such as wood or plastic reinforced with metal, to name a representative combination. Transport assembly 440 broadly includes a padded full width bench seat 442 construction. Once hitch panel portion 430(2) has been removed, bench seat 442 may be dropped into place in an interior of the revised cargo bed insert 400 so that it is supported by both the decking (namely beams 423, 424, 428(1) and plywood panel portion 427(1)) and the left and right side walls. To this end, as shown in FIGS. 38a and 38b, bench seat assembly 442 includes left and right posts 448(1) and 448(2) which drop into place in available option slots to obtain a secure fit within cargo bed insert 400. Bench seat 442 includes a seat pad 444 that is preferably 20" deep and a backrest 446 that is preferably 27" tall. As shown in FIGS. 38a and 38b, backrest 446 includes a reclining mechanism 447 so that it can recline at selected positions, in much the same manner as what is encountered with driver's seat of diesel pickup trucks or reclining lawn chairs. Easy access large utility handles 449(1) and 449(2) facilitate the installation and removal of bench seat 442.

Player transport assembly 440 also includes left and right leg injury supports 450 and 460, respectively, which are removably insertable into the cargo bed. These supports can be moved from a stowed position in a forward region of the cargo bed insert 400, such as shown with respect to right leg support 460 in FIG. 39a, to a use position shown in FIG. 39b. It can be appreciated that each of FIGS. 36, 37a & b, and 38a & b depict the left and right leg supports 450 and 460 placed in the use position towards the rear of the cargo bed insert 400, and particularly in the two rearmost opposed option slots thereof.

Figure 41A:
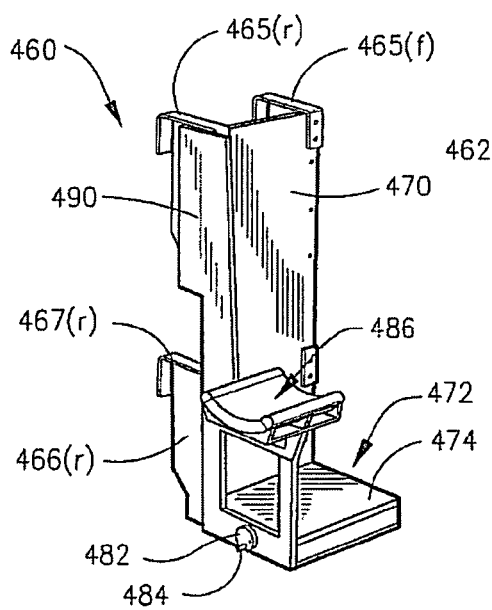
Figure 41B:
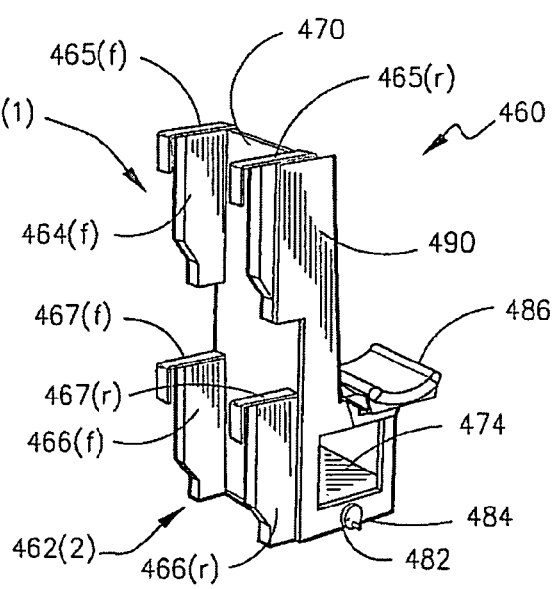

For purposes of explanation, the right leg support 460 is described, with the understanding that left leg support 450 is constructed in similar fashion. The construction for right leg support 460 is perhaps best appreciated with reference to FIGS. 39 through 42b. As perhaps best seen in FIGS. 39 and 41b, right leg support 460 includes upper and lower hanger bracket assemblies, generally 462(1) and 462(2), respectively. Each of the upper and lower hanger bracket assemblies includes forward and rear beveled posts having associated hanger brackets mounted thereto. More particularly, upper hanger bracket assembly 462(1) includes a forward post 464 (f) having an associated hanger bracket 465(f) and a rear post 464(r) having an associated hanger bracket 465(r). Similarly, lower portion 462(2) includes a forward post 466(f) having an associated hanger bracket 467(f), and a rear post 466(r) having an associated hanger bracket 467(r). Each of the posts are beveled as shown in various ones of the figures so that they follow the geometry of the option slots associated with the cargo bed insert's right (or driver's side) sidewall construction, all as discussed previously. When in the stowed position shown in FIG. 39 the lower hanger bracket assembly 462(2) is received within available ones of the right side bed's slots. When in the use position shown, for example, in FIG. 40, the upper hanger assembly 462(1) is removably inserted into available slots on the rear portion of the cargo bed insert so that the right leg support hangs in a suspended fashion.

Figures 42A, 42B:
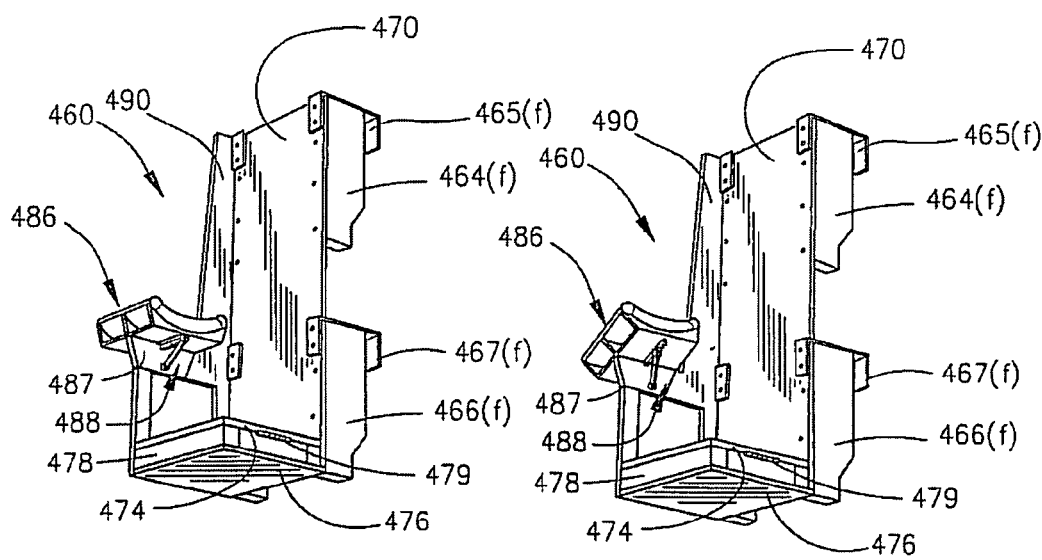
FIGS. 42a and 42b are different bottom perspective views of the right leg support.

Right leg support 460 includes a primary brace wall 470, preferably of plywood material, to which the various hanger brackets and posts are secured via suitable screws, as shown in various ones of the figures. Conveniently, as illustrated in FIGS. 42a and 42b, brackets 467(f) and 467(r) are each received in an associated slit formed within primary brace wall 470 so that all four of the post and bracket constructions can be constructed the same and used interchangeably. A foot support, generally 472, can be suitably secured to a lower portion of the primary brace wall 470, for example, via mounting screws (not shown). Footrest 472 includes a cam-actuated hinged upper footplate 474. More particularly, footrest 472 is a box-like construction as shown in various ones of the figures and includes the upper footplate 474 upon which the player rests his/her right foot, a lower base plate 476, and a surrounding sidewall (generally 478) extending there between. Footplate 474 is hinged to sidewall 478 via a conventional hinge 479, as shown in FIGS. 42a and 42b. Footplate 474 is cam-actuated to provide an inclined orientation (not shown), much like that used on the pedestals for old-style wheelchairs. To this end, a rotatable camming mechanism 480 is provided. Camming mechanism 480 includes a rotatable wheel 482 which is rotatably retained in at least two positions via a removable pin 484. Rotation of camming wheel 482 causes a lobed internal cam 485 (FIG. 41c) to urge footrest 474 upwardly into the inclined position, or to allow the footrest to resume its horizontal position shown throughout various FIGURES.

A pivoting calf rest 486 is also provided and can be maneuvered into a plurality of orientations via a rack and pinion mechanism, generally 488. A horizontal position for the calf rest 486 is shown, for example, in FIG. 40*a*, while an extreme inclined position is shown in FIG. 42*b*. Projecting from primary brace wall 470 is a calf rest mounting wall 490 as shown in various FIGURES. Calf rest mounting wall 490 has a toe opening 492 formed there through (FIG. 39). As perhaps best illustrated in FIGS. 42*a* and 42*b*, calf rest 486 includes a slotted mounting bracket 487 which is received over a portion of mounting wall 490 as shown.

When both of the left and right leg supports 450 and 460 are attached within the available option slots such that they hang down in a suspended manner as shown in FIGS. 36-38*b*, they offer adjustability for assisting with the transport of players, particularly large players, whose injuries require comfortable support for the injured limb. The selectively positionable footrests with associated toe holes are enlarged to accommodate large sized shoes with field spikes. Further, the adjustable calf rest can be used for an injured leg to provide multiple options for training staff to position an injured leg/ankle for maximum comfort.

Conveniently, the leg supports are stowable behind the bed-mounted seat in a secure position until the appropriate leg support(s) is selected to accommodate the injured player. It is anticipated that either or both of the leg supports could be used at any given time. Prior to installation, the player transport assembly can be moved proximately to the player's position to allow the vehicle to approach the player with no impediments to the ability of situating the player in seat assembly 442. When required, the vehicle's electric lift mechanism can position the cargo bed insert at an angle optimum for the player to sit down. Additionally, activating the lift can assist the player to stand up from the transported position once he has arrived at the location of treatment.

Finally, as shown in FIGS. 36-38*b*, a tray assembly 492 can be installed after the player is situated in seat assembly 442. Tray assembly 492 includes a horizontal load bar assembly 494 that is provided with a plurality of spaced apart arms 495(1)-495(3) (see FIG. 38*b*) which support a padded cushion 496 secured thereto. Tray assembly 492 can serve multiple purposes. If desired by the medical/training staff, the on-board tray 496 can be stored between laterally opposed slots in the front of the cargo bed insert behind the seat. Once the injured player is situated, it can then be moved in front of the player to allow him/her to rest one or both arms. Optionally also, it can be used to support a pillow that can provide a comfortable resting place in the case of an arm or shoulder injury. Further still, it can provide a location for medical staff or their equipment to be situated, if needed.

Having described the player transport assembly, it can be appreciated that the front end mounted assembly discussed above with reference to FIGS. 21-34 can be used to provide sufficient counter balance weight, as needed. Further, the ability to optionally locate the weights either centered or offset from center can enhance the steering efficiency and loading of the vehicle for safe and effective transport from the point of injury on the playing field. For example, if a player has a right leg injury and is situated on the driver's side of the vehicle, then suitable counter weights can be provided on the passenger side of the vehicle at the front end to offset this.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A cargo bed insert apparatus for insertion into a vehicle bed having a selected vehicle bed interior length and a selected vehicle bed interior width, comprising:
  a. a cargo bed insert having a selected cargo bed interior width and a selected cargo bed interior length, said cargo bed insert comprising:
    i. a generally rectangular decking; and
    ii. a wall structure including a pair of upwardly projecting left and right sidewalls each including a plurality of left and right slots, with corresponding ones of said left and right slots being in opposed facing relationship to one another; and
  b. a plurality of first cargo support structures each removably supported within respective opposed ones of said left and right slots at various locations therealong to create a platform for supporting elongate cargo, each of said first cargo support structures comprising a pair of laterally spaced apart and downwardly depending protrusions positioned to be received within the opposed ones of said left and right slots, and laterally spaced apart and upwardly extending arms for restricting lateral movement of cargo when supported by said load beam structures.

2. A cargo bed insert apparatus according to claim 1 wherein said wall structure further comprises a front wall for confronting a vehicle cab when said cargo insert is inserted in the vehicle bed, and at least one tailgate.

3. A cargo bed insert apparatus according to claim 2 further comprising at least a second cargo support structure removably fastened to at least one of said front wall and said tailgate.

4. A cargo bed insert apparatus according to claim 2 further comprising a plurality of second cargo support structures, one of said second cargo support structures removably fastened to said front wall and another of said second cargo support structures removably fastened to said tailgate so that said second cargo support structures may accommodate elongate cargo of varying lengths, including cargo which is longer than either the vehicle or the vehicle bed.

5. A cargo bed insert according to claim 3 wherein said second cargo support structure comprises a pair of respective laterally spaced apart and upwardly extending arms for accommodating elongate narrow cargo therebetween, said arms defining stops for restricting lateral movement of said cargo during travel.

6. A cargo bed insert according to claim 4 wherein said one of said second cargo support structures includes a plurality of spaced apart first mounting structures, and said front wall includes a plurality of spaced apart second mounting structures that are cooperative with said first mounting structures to permit said one of said second cargo support structures to be removably fastened to said front wall at a plurality of discrete mounting locations.

7. A cargo bed insert apparatus according to claim 4 wherein said another of said second cargo support structures includes a plurality of spaced apart said first mounting structures and said tailgate includes a plurality of spaced apart said second mounting structures that are cooperative with at least one of said first mounting structures to permit said another of said second cargo support structures to be removably fastened to said tailgate at a plurality of discrete mounting locations so that, together, said first and second cargo supporting load beams can accommodate and support elongate cargo of varying length and width dimensions.

8. A cargo bed insert apparatus according to claim 6 wherein said first mounting structures are eye bolts and said second mounting structures are eye bolt couplers that are removably fastened to said eye bolts, each of said eye bolts providing a tie down point when cargo is accommodated by said plurality of second cargo support structures.

9. A cargo bed insert apparatus according to claim 8 including a plurality of additional first mounting structures fastened to, and distributed about, said wall structure to provide additional tie down points for cargo.

10. A cargo bed insert apparatus according to claim 9 wherein at least one of said additional first mounting structures projects exteriorly of said wall structure.

11. A cargo bed insert apparatus according to claim 9 wherein at least one of said additional first mounting structures projects interiorly of said wall structure.

12. A cargo bed insert apparatus according to claim 9 including a plurality of additional second mounting structures each receiving at least one of said additional first mounting structures.

13. A cargo bed insert apparatus according to claim 1 wherein each of said first cargo support structures is a cargo supporting load beam assembly.

14. A cargo bed insert apparatus according to claim 2 wherein said tailgate is removably insertable between said sidewalls between a first orientation wherein a first transversely extending portion of said tailgate abuts said decking, and a second orientation wherein a gap extends between said decking and a second transversely extending portion of said tailgate.

15. A cargo bed insert apparatus according to claim 14 including a plurality of tailgates each removably insertable between said sidewalls.

16. A cargo bed insert apparatus according to claim 15 wherein each of said tailgates is removably insertable between said sidewalls between a first orientation wherein a first transversely extending portion of said tailgate abuts said decking, and a second orientation wherein a gap extends between said decking and a second transversely extending portion of said tailgate.

17. A cargo bed insert apparatus according to claim 1 wherein said cargo bed insert length is greater than the vehicle bed length.

18. A cargo bed insert apparatus for insertion into a vehicle bed having a selected vehicle bed interior length and a selected vehicle bed interior width, comprising:
   a. a cargo bed insert having a selected cargo bed interior width and a selected cargo bed interior length, said cargo bed insert comprising:
      i. a generally rectangular decking; and
      ii. a wall structure including a pair of upwardly projecting left and right sidewalls each including a plurality of left and right slots, with corresponding ones of said left and right slots being in opposed facing relationship to one another; and
   b. a plurality of cargo support structures each removably supported within respective opposed ones of said left and right slots at various locations therealong to create a platform for supporting elongate cargo, each of said at least one cargo support structures comprising upwardly extending and laterally spaced apart arms for restricting lateral movement of cargo when supported by said load support structures, and a width dimension between said arms which is greater than the vehicle bed interior width to allow said cargo bed insert to accommodate correspondingly dimensioned flat cargo.

19. A light duty utility vehicle, comprising:
   a. a body having a selected body length and a selected body width;
   b. a drive assembly;
   c. a plurality of wheels;
   d. a steering mechanism; and
   e. a cargo bed structure having a selected cargo bed interior width and a selected cargo bed interior length, said cargo bed comprising:
      i. a generally rectangular decking;
      ii. a wall structure including a pair of upwardly projecting left and right sidewalls each including a plurality of left and right slots, respectively, with corresponding ones of said left and right slots being in opposed relationship to one another;
      iii. at least one cargo support structure which may be removably disposed relative to said wall structure at various locations therealong, said at least one cargo support structure comprising upwardly extending and laterally spaced arms for restricting lateral movement of cargo, and at least one of:
         1. at least a pair of first cargo support structures removably fastened to said front wall and said tailgate, respectively, to accommodate elongate cargo of varying lengths, including cargo which is longer than said cargo bed length and/or said vehicle body length; and
         2. at least a pair of second cargo support structures removably supported within respective opposed ones of said left and right slots to create a platform for supporting elongate and wide cargo; and
      iv. wherein each of said second cargo support structures comprises a horizontal support beam and a pair of respective laterally spaced apart and upwardly extending arms for accommodating elongate, wide cargo therebetween, said arms defining stops for restricting lateral movement of said cargo during travel, there being a width dimension between said upwardly extending arms which is greater than the cargo bed interior width to allow said cargo bed insert to accommodate correspondingly dimensioned flat cargo.

20. A light duty utility vehicle according to claim 19 wherein said wall structure further comprises a front wall for confronting the vehicle cab, and at least one tailgate.

21. A light duty utility vehicle according to claim 20 wherein said at least one tailgate is removably insertable between said sidewalls between a first orientation wherein a first transversely extending portion of said tailgate abuts said decking, and a second orientation wherein a gap extends between said decking and a second transversely extending portion of said tailgate.

22. A light duty utility vehicle according to claim 21 wherein said at least one tailgate is invertable between the first orientation and the second orientation.

23. A light duty utility vehicle according to claim 19 wherein each of said first cargo support structures comprises a pair of respective laterally spaced apart and upwardly extending arms for accommodating elongate narrow cargo therebetween, said arms defining stops for restricting lateral movement of said cargo during travel.

24. A light duty utility vehicle according to claim 19 including a plurality of eye bolts distributed about at least one of said pair of first cargo support structures and said wall structure to provide tie down points for loaded cargo.

25. A light duty utility vehicle according to claim 24 wherein said at least some of said eye bolts project interiorly of said wall structure, and at least others of said eye bolts project exteriorly of said wall structure.

26. A light duty utility vehicle according to claim 19 including a weight management system disposed on a front end portion of said vehicle body for maintaining vehicle stability and steering when heavy cargo is transported by said vehicle.

27. A light duty utility vehicle according to claim 26 wherein said weight management system comprises a mounting assembly disposed on the front end portion of the vehicle and a selected quantity of weight removably suspended from said mounting assembly.

28. A light duty utility vehicle according to claim 19 including a mounting assembly disposed on a front end portion of said vehicle, said mounting assembly incorporating an associated cargo load bearing structure.

29. A light duty utility vehicle according to claim 28 including a selected quantity of weight removably suspended from said mounting assembly for maintaining vehicle stability and steering when heavy cargo is transported by said vehicle.

30. A light duty utility vehicle according to claim 19 wherein said cargo bed structure comprises:
   a. an OEM cargo box having a cargo box bed and left and right cargo box sidewalls; and
   b. a cargo bed insert disposed in at least a portion of said OEM cargo box, said cargo bed insert including said generally rectangular decking and said wall structure.

31. A light duty utility vehicle according to claim 30 wherein said cargo box has a cargo box interior length and said cargo bed insert has a cargo bed insert interior length which is greater than said cargo box interior length such that said cargo bed insert overhangs a rear of said cargo box.

32. A light duty utility vehicle according to claim 31 wherein said wall structure further comprises a front wall for confronting the vehicle cab, and at least one tailgate that is removably insertable between said left and right sidewalls in an overhanging region thereof, and wherein said cargo bed insert further comprises a plurality of tie down points in the overhanging region for securing elongate cargo.

* * * * *